US008725327B2

(12) United States Patent
Shroff

(10) Patent No.: US 8,725,327 B2
(45) Date of Patent: May 13, 2014

(54) NAVIGATION SYSTEM AND METHOD OF OBTAINING ACCURATE NAVIGATIONAL INFORMATION IN SIGNAL CHALLENGING ENVIRONMENTS

(75) Inventor: Diniar S. Shroff, Thousand Oaks, CA (US)

(73) Assignee: Exelis Inc., McLean, VA (US)

( * ) Notice: Subject to any disclaimer, the term of this patent is extended or adjusted under 35 U.S.C. 154(b) by 1432 days.

(21) Appl. No.: 12/107,457

(22) Filed: Apr. 22, 2008

(65) Prior Publication Data
US 2009/0265104 A1 Oct. 22, 2009

(51) Int. Cl.
| B60L 3/00 | (2006.01) |
| B60L 15/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .......................................................... 701/21

(58) Field of Classification Search
USPC ................................. 701/21; 342/357.3, 0.32
See application file for complete search history.

(56) References Cited

U.S. PATENT DOCUMENTS

| 4,189,116 | A | * | 2/1980 | Ehrich et al. .................. 244/3.16 |
| 4,713,767 | A | * | 12/1987 | Sato et al. ....................... 701/505 |
| 4,752,884 | A | * | 6/1988 | Slafer et al. ...................... 701/13 |
| 5,102,072 | A | * | 4/1992 | Egan et al. ..................... 244/195 |
| 5,400,269 | A | * | 3/1995 | White et al. ................... 702/190 |
| 5,459,473 | A | * | 10/1995 | Dempster et al. ........ 342/357.25 |
| 5,740,048 | A | * | 4/1998 | Abel et al. ..................... 701/470 |
| 5,828,336 | A | * | 10/1998 | Yunck et al. ............. 342/357.31 |
| 5,949,371 | A | * | 9/1999 | Nichols ..................... 342/357.27 |
| 6,331,835 | B1 | * | 12/2001 | Gustafson et al. ....... 342/357.59 |

(Continued)

FOREIGN PATENT DOCUMENTS

EP 1857833 A1 11/2007

OTHER PUBLICATIONS

Kevin J. Walchko, "Low Cost Inertial Navigation: Learning to Integrate Noise and Find Your Way", A Thesis Presented to the Graduate School of the University of Florida in Partial Fulfillment of the Requirements for the Degree of Master of Science, University of Florida, 2002.

(Continued)

*Primary Examiner* — Bhavesh V. Amin
*Assistant Examiner* — Nicholas Kiswanto
(74) *Attorney, Agent, or Firm* — Edell, Shapiro & Finnan, LLC

(57) ABSTRACT

A present invention embodiment includes a navigation system with a front-end GPS receiver, auxiliary sensors and a digital signal processor providing filtering and other processing. The navigation system enhances a UTC type architecture by employing an inertial compensation unit and a stochastic regulator. The inertial compensation unit compensates for inertial errors within the sensors, while the stochastic regulator applies an optimal stochastic control law to control system operation. The inertial compensation unit and stochastic regulator mitigate instability within the navigation system and provide: the functionality to attain high position accuracy in the sub-meter range that is stable and reliable; an optimal solution evident in the process of signal recovery time after loss and reacquisition, thereby resulting in signal-loss recovery with an order of magnitude improvement; and the ability to mitigate inertial errors that originate in the sensors. The navigation system provides navigation information for indoor and urban environmental conditions.

28 Claims, 10 Drawing Sheets

(56) References Cited

U.S. PATENT DOCUMENTS

| | | | |
|---|---|---|---|
| 6,516,021 B1 | 2/2003 | Abbott et al. | |
| 6,522,266 B1* | 2/2003 | Soehren et al. | 340/988 |
| 6,535,833 B1* | 3/2003 | Syrjarinne | 702/150 |
| 6,630,904 B2* | 10/2003 | Gustafson et al. | 342/357.59 |
| 6,664,923 B1* | 12/2003 | Ford | 342/357.59 |
| 6,731,237 B2 | 5/2004 | Gustafson et al. | |
| 6,753,810 B1* | 6/2004 | Yang et al. | 342/357.27 |
| 6,859,727 B2* | 2/2005 | Bye et al. | 701/510 |
| 6,914,931 B2 | 7/2005 | Douglas et al. | |
| 7,193,559 B2* | 3/2007 | Ford et al. | 342/357.32 |
| 7,212,155 B2* | 5/2007 | Hatch et a | 342/357.26 |
| 7,225,060 B2* | 5/2007 | O'Connor et al. | 701/1 |
| 7,236,091 B2* | 6/2007 | Kiang et al. | 340/539.1 |
| 7,249,730 B1* | 7/2007 | Flippen, Jr. | 244/3.15 |
| 7,298,319 B2* | 11/2007 | Han et al. | 342/357.27 |
| 7,487,933 B1* | 2/2009 | Chen et al. | 244/3.15 |
| 7,715,964 B1* | 5/2010 | Connally | 701/41 |
| 7,791,529 B2* | 9/2010 | Filias et al. | 342/115 |
| 2004/0012522 A1* | 1/2004 | Groves | 342/357.14 |
| 2004/0133346 A1* | 7/2004 | Bye et al. | 701/210 |
| 2004/0140405 A1* | 7/2004 | Meyer | 246/122 R |
| 2005/0248485 A1* | 11/2005 | Hatch et al. | 342/357.12 |
| 2006/0025894 A1* | 2/2006 | O'Connor et al. | 701/1 |
| 2006/0027404 A1* | 2/2006 | Foxlin | 178/18.06 |
| 2006/0089796 A1* | 4/2006 | Harrison et al. | 701/209 |
| 2007/0075893 A1* | 4/2007 | Filias et al. | 342/104 |
| 2007/0118286 A1 | 5/2007 | Wang et al. | |
| 2007/0257831 A1* | 11/2007 | Mathews et al. | 342/22 |
| 2008/0265097 A1* | 10/2008 | Stecko et al. | 244/135 A |
| 2009/0125163 A1* | 5/2009 | Duggan et al. | 701/2 |

OTHER PUBLICATIONS

Di Li, Jinling Wang, "Kalman Filter Design Strategies for Code Tracking Loop in Ultra-Tight GPS/INS/PL Integration", School of Surveying and Spatial Information Systems, The University of New South Wales, Sydney, Australia.

Y. Gao, E. J. Krakiwsky, M. A. Abousalem, J. F. McLellan, "Comparison and Analysis of Centralized, Decentralized, and Federated Filters", Navigation: Journal of The Institute of Navigation, vol. 40, No. 1, Spring 1993, pp. 69-86.

Ravindra Babu, Jinling Wang, "Ultra-Tight GPS/INS/PL Integration: Kalman Filter Performance Analysis", School of Surveying and Spatial Information Systems, University of New South Wales.

Greg Welch, Gary Bishop, "An Introduction to The Kalman Filter", University of North Carolina at Chapel Hill, 2001.

European Search Report, EP09157271, Feb. 24, 2012, 8 pages.

* cited by examiner

NAVIGATION SYSTEM AND METHOD OF OBTAINING ACCURATE NAVIGATIONAL INFORMATION IN SIGNAL CHALLENGING ENVIRONMENTS

BACKGROUND OF THE INVENTION

1. Technical Field

The present invention pertains to navigation systems. In particular, the present invention pertains to compensating for errors of inertial instruments and providing stochastic control within a navigation system (e.g., GPS, etc.) in order to obtain accurate navigational information in a signal challenging environment and provide rapid re-acquisition of a satellite signal after signal loss.

2. Discussion of Related Art

A Global Positioning System (GPS) receiver acquires and/or tracks a satellite signal by generating a replica signal of a signal received from the satellite and correlating the replica signal with the signal currently being received from the satellite. The replica signal is advanced or delayed in time until correlation with the received signal is attained. Generally, this process is performed by respective tracking loops for a code (e.g., pseudorandom noise code (PRN)) and the corresponding carrier signal. A code tracking loop drives the code phase of a replica signal to be in alignment with the code phase of the received signal, thereby enabling coherent demodulation of the received signal.

The tracking loops adjust the phase and the frequency of the generated replica signal for numerous changing variables (e.g., user and satellite relative motion, user clock drifts, etc.), and typically include a signal generator or numerically controlled oscillator, a correlator, a discriminator or error generator and a controller. The signal generator generates an estimated replica signal of the received signal based on a control signal that advances or delays in time the replica signal relative to the received signal. The correlator multiplies the received signal by the replica signal and passes the multiplied signal result through a low pass filter. The discriminator generator generates an error or discriminator signal having a value related to the difference between the received signal and the replica signal, while the controller filters the discriminating signal into the control signal that is provided to the signal generator.

The tracking loops basically determine the error signal that is a measure of the range and range rate difference between the generated and received signals. The error signal is processed by a transfer function that generates input values for the signal generator to advance or delay the generated replica signal. Once the replica signal correlates with the received signal, the tracking loop is in lock and the error signal provided to the signal generator is near zero. In this case, the state of the generation process for the code and carrier signal can be sampled to obtain a measure of the pseudorange and pseudorange rate. The pseudorange is the algebraic sum of the geometric range between the transmit antenna and receive antenna, and a bias due to a user and satellite vehicle clock error. The pseudorange rate is approximated by the sum of the amount of range change for a predetermined amount of time and a bias due to the drift of the user oscillator frequency. The psuedorange and/or pseudorange rate measurements are utilized to estimate navigational information (e.g., position, velocity, etc.).

A navigation receiver should be able to withstand signal interference with respect to signal acquisition and tracking. Accordingly, inertial navigation systems have been combined with GPS signal tracking and acquisition systems in tightly coupled and ultratightly coupled architectures for enhanced tracking and acquisition of the received signal. Initially, inertial navigation systems (INS) include an inertial measurement unit (IMU) for processing inertial measurements. Inertial aiding is utilized to apply the data from the IMU to assist the tracking loops (or the extrapolation of the user position and velocity).

With respect to a tightly coupled architecture, the relative motion between the satellite antenna and the user antenna may be predicted to a certain accuracy based on the IMU measurements and the position and velocity of a satellite evaluated from the satellite ephemeris data (e.g., status and location information). The GPS with inertial aiding uses known user relative motion from IMU measurements and the satellite position and velocity data evaluated from the ephemeris data to compute the line-of-sight rate between the user antenna and the GPS satellite for providing rate data to aid the tracking loops. The pseudorange and psuedorange rate measurements from the GPS receiver are utilized (instead of the processed position and velocity measurements from the INS) to produce navigational information (e.g., position, velocity, etc.).

An ultratight coupling (UTC) technique is disclosed in U.S. Pat. No. 6,516,021 (Abbott et al.). This type of technique drives signal generators for each satellite channel using information from the current best estimate of a navigation state vector and satellite position and velocity predicted from the satellite ephemeris data. The navigation state vector contains best estimates of user position, velocity, attitude, receiver clock errors and calibration coefficients for the IMU. The best estimate of the navigation state vector is based on a previous major cycle of an integration Kalman filter, and IMU samples from a previous major cycle update. In the ultratight coupling technique, the quadrature I and Q samples from a correlator are sent to a Kalman pre-filter that processes the samples and produces a measurement residual error vector needed by the integration Kalman filter based on the errors in the code and carrier replica signals provided to correlators (rather than an absolute measurement of pseudorange or pseudorange rate). The integration Kalman filter uses the best estimate of the predicted navigation state vector to generate samples of the predicted pseudorange and the pseudorange rate for the major cycle of the integration Kalman filter. This predicted pseudorange and pseudorange rate information, in conjunction with the satellite ephemeris information and inertial measurement data, are used to generate and update the code and carrier replica signals used in the correlation process for improved tracking and accuracy. Thus, the IMU measurements, time propagation using the user oscillator and satellite ephemeris data are used to drive the correlation process for replica signal generation. Since these items are not vulnerable to interference or jamming, the ultratight coupling technique provides interference tolerance.

SUMMARY

The present invention embodiments provide an extended architecture for a navigation system based on an ultratightly coupled (UTC) type scheme. The extended architecture employs extended Kalman Filter (EKF) and Pre-Filter (PF) algorithms to provide highly accurate geolocation information (e.g., position, kinematics, orientation, and time). In order to obtain highly accurate navigational information in signal challenging environments, distributed high performance adaptive algorithms for control and estimation of stochastic processes are employed to compute uncertainties in predictions, and utilize these uncertainties through recursive feedback loops.

The present invention embodiments mitigate free inertial error growth rate in navigational systems designed to adapt to various platform dynamics by combining measurements from GPS and inertial data streams. An embodiment of the present invention includes a navigation system with a front-end GPS receiver, auxiliary sensors and a digital signal processor providing the filtering and other processing. The navigation system enhances capability within a UTC type architecture by employing an inertial compensation unit and a stochastic regulator. The inertial compensation unit compensates for inertial errors within the sensors (or inertial measurements), while the stochastic regulator applies an optimal stochastic control law to control system operation. The inertial compensation unit and stochastic regulator mitigate instability within the navigation system and are capable of providing: the functionality to attain high position accuracy in the sub-meter range that is stable and reliable; an optimal solution evident in the process of signal recovery time after loss and reacquisition, thereby resulting in signal-loss recovery with an order of magnitude improvement; and the ability to mitigate inertial errors that originate in the sensors. The navigation system provides navigation information (e.g., geo location information, kinematics information referenced to the Earth and sun for terrestrial and celestial navigation, respectively, and temporal information via Universal Time Coordinates) for indoor and urban environmental conditions.

In addition, the present invention embodiments reduce computational intensity and may accommodate large range dynamic applications. The reduction in computational intensity provides systems that are less demanding on electrical power and require less hardware real estate, thereby reducing system size and weight.

The above and still further features and advantages of the present invention will become apparent upon consideration of the following detailed description of example embodiments thereof, particularly when taken in conjunction with the accompanying drawings wherein like reference numerals in the various figures are utilized to designate like components.

DETAILED DESCRIPTION OF THE PREFERRED EMBODIMENTS

The present invention embodiments provide an extended architecture for a navigation system based on an ultratightly coupled (UTC) type scheme. The extended architecture employs extended Kalman Filter (EKF) and Pre-Filter (PF) algorithms to provide highly accurate geolocation information (e.g., position, kinematics, orientation, and time). In order to obtain highly accurate navigational information in signal challenging environments, distributed high performance adaptive algorithms for control and estimation of stochastic processes are employed to compute uncertainties in predictions, and utilize these uncertainties through recursive feedback loops. The present invention embodiments enhance capability within a UTC type architecture by employing an inertial compensation unit and a stochastic regulator. The inertial compensation unit compensates for inertial errors within sensors (or inertial measurements), while the stochastic regulator applies an optimal stochastic control law to control system operation as described below.

Figure 1:
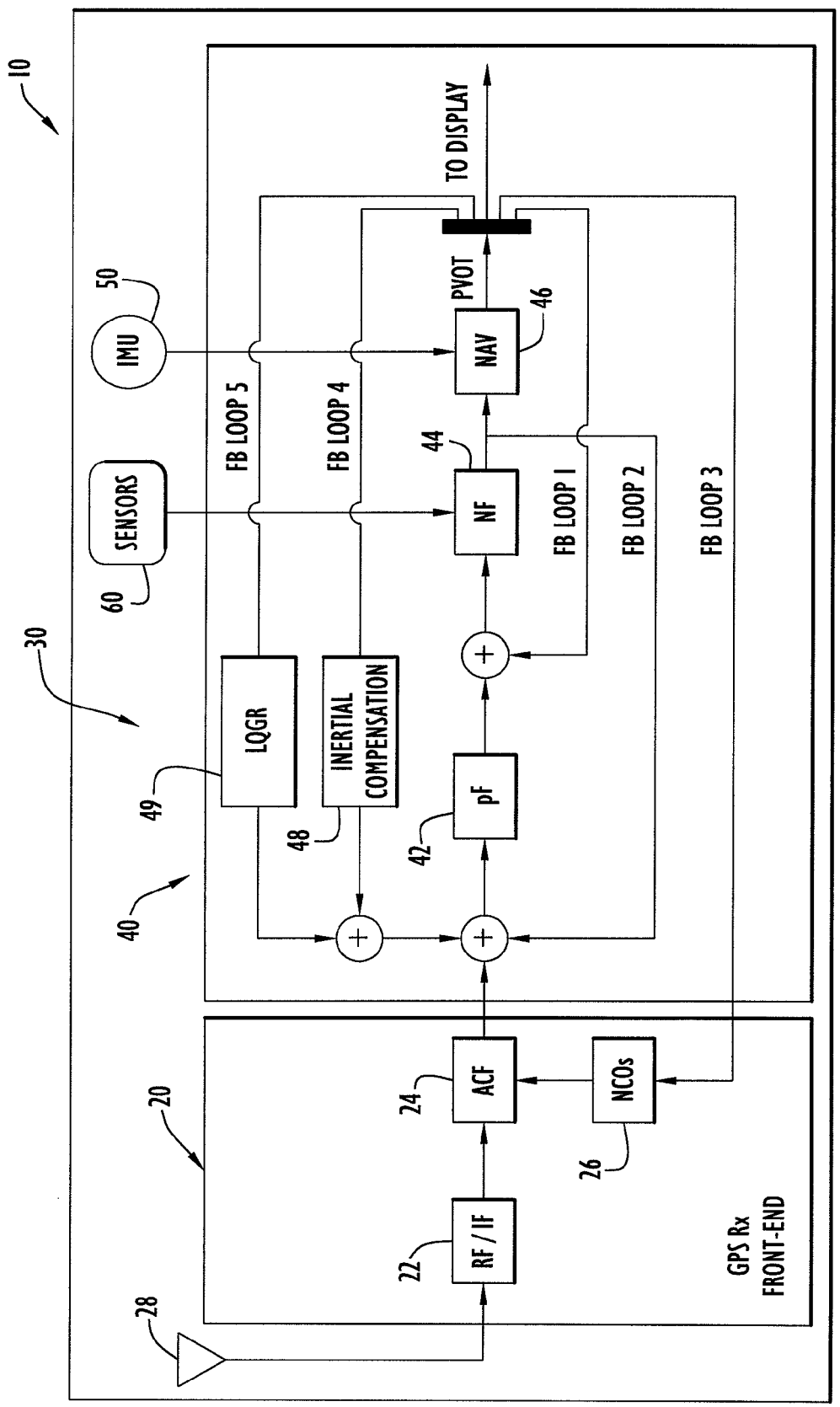
FIG. 1 is a functional block diagram of an example navigation system according to an embodiment of the present invention.

A navigation system according to an embodiment of the present invention is illustrated in FIG. 1. Specifically, a navigation system 10 includes a GPS receiver 20 and a navigation unit 30. GPS receiver 20 may be implemented by any conventional or other GPS type receiver and includes an RF/IF unit 22, an autocorrelation function (ACF) unit 24 and a numerically controlled oscillator (NCO) 26. RF/IF unit 22 performs signal conditioning, translation (e.g., down conversion), filtering, and digitization functions of signals received by an antenna 28 for the purposes of generating in-phase (I) and quadrature (Q) signals. These signals are provided to autocorrelation function unit 24, where orthogonal phase samples from autocorrelation function unit 24 are controlled/modulated by oscillator 26 to adjust the incoming carrier frequency. The autocorrelation function unit provides prompt, early and late component (I and Q) versions of a signal, where the early and late versions are relative to the prompt signal arrival time.

The navigation unit includes a digital signal processor 40, and receives the early, prompt and late signal versions from autocorrelation function unit 24 of GPS receiver 20. The signal processor may be implemented by any conventional or other processor and/or circuitry (e.g., microprocessor, controller, digital or other signal processor, logic circuits, circuitry, etc.). The signal processor may include any conventional or other hardware or processing units (with or without software units or modules) to perform the functions described herein. The navigation unit is preferably disposed on the desired platform (e.g., air, ground or sea vehicle, hand-held or transportable unit for ground users, etc.), where the receiver and navigation unit may be disposed locally or remotely from each other depending upon the particular application.

Figure 2A:
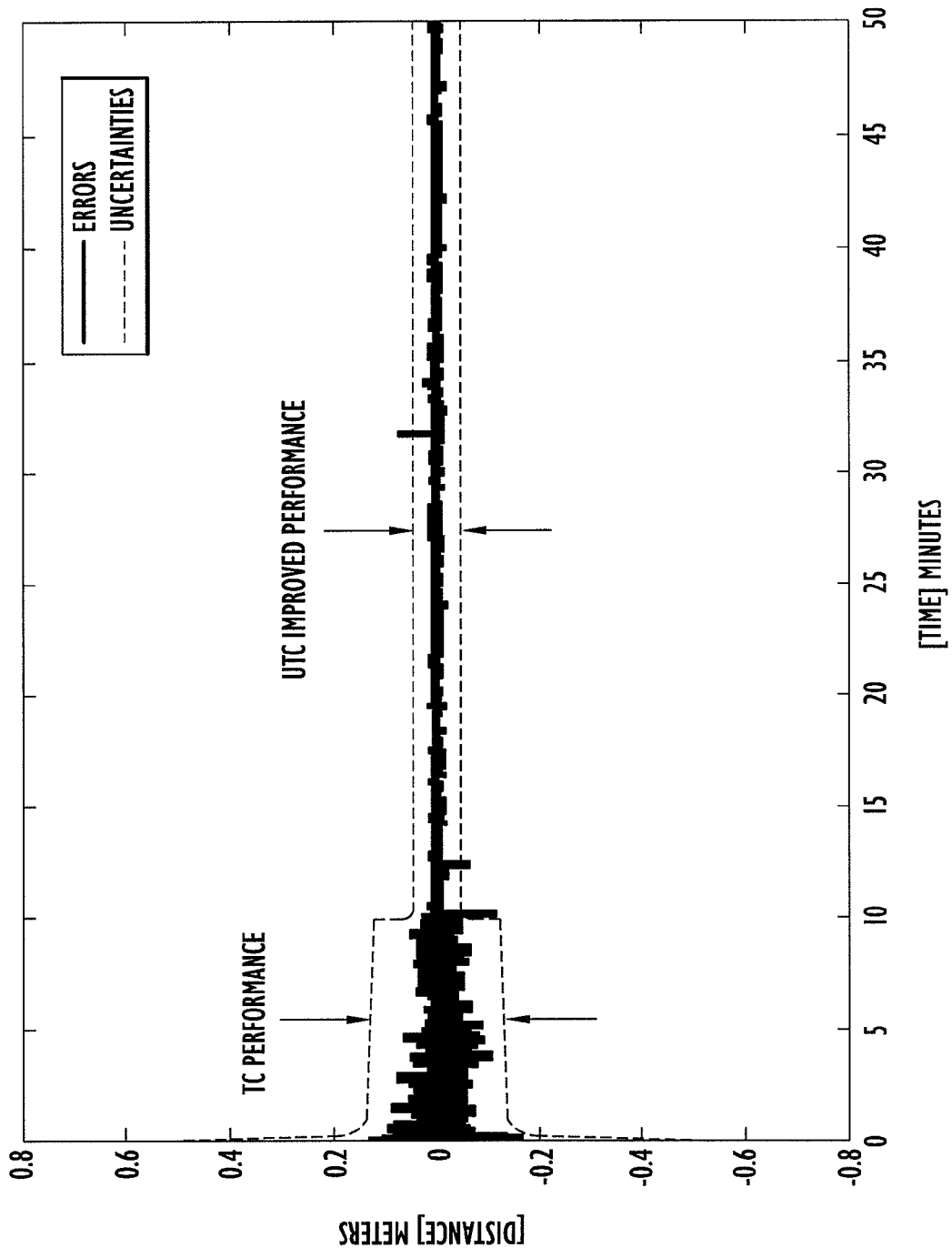
FIGS. 2A-2B are graphical plots illustrating the differing performance levels in a tightly coupled architecture and the ultratightly coupled architecture of the system of FIG. 1 for pedestrian and vehicle scenarios.
Figure 2B:
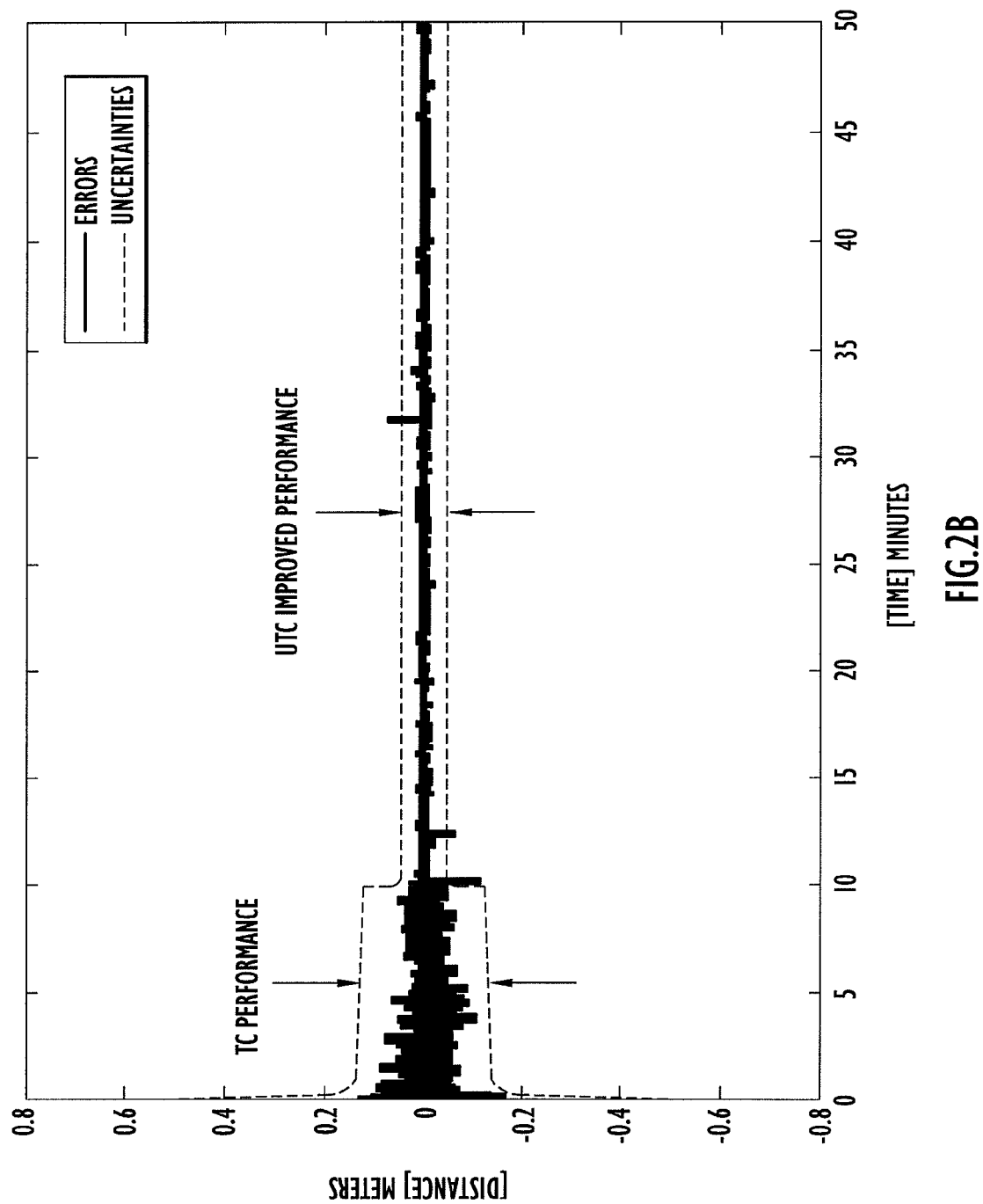

In order to minimize computational loading, navigation unit 30 employs an ultratightly coupled (UTC) type architecture with distributed and asynchronous processes. The ultratightly coupled (UTC) type architecture employed by navigation unit 30 is a robust architecture that implements simultaneous and composite tracking of different satellites, thereby aiding each other and resulting in improved Anti Jam (A/J) margins, improved navigation accuracy, and integrity as demonstrated and quantified by simulation results. Referring to FIGS. 2A-2B, the plots illustrate at least an order of magnitude improvement by the UTC architecture of navigation unit 30 as compared with the tightly coupled approach. The trajectories implemented include scenarios for walking (FIG. 2A) and vehicle motion (FIG. 2B).

Navigation unit 30 includes pre-filters 42 ('pF' as viewed in FIG. 1), a navigation Kalman filter 44 ('NF' as viewed in FIG. 1), a strapdown inertial navigator 46 ('Nav' as viewed in FIG. 1), an inertial compensation unit 48 and a linear quadratic Gaussian regulator 49 ('LQGR' as viewed in FIG. 1). These units are typically implemented by digital signal processor 40. The pre-filters, navigation filter and navigator are collectively referred to herein as the 'plant' and implement the UTC scheme. The inertial compensation unit, Gaussian regulator and integration of these within the navigation unit assures navigation quality information being available in indoor and urban environments. An Inertial Measurement Unit (IMU) 50 is coupled to navigator 46 to provide inertial sensor measurements (e.g., raw inertial measurements of motion that are converted to geodetic information) as described below, while a sensor module 60 is coupled to navigation filter 44 to similarly provide measurements (e.g., geodetic position information). Extended filtering (e.g., the combination of pre-filters 42 and Kalman filter 44) is employed by the navigation unit to estimate signal parameters as described below. Basically, early, prompt and late versions of digitized in-phase (I) and quadrature (Q) phase components of the signal are provided to pre-filters 42. These filters recursively perform an estimation of the carrier phase and rate errors, range bias error, ionospheric total electron count (TEC) error, and signal amplitude error as described below. The estimates are provided to navigation filter 44 serving as a state estimation processor for the navigation unit to produce corrections for a navigation solution, where sensor information including the GPS and other data streams (e.g., from sensor module 60 and excluding measurements from IMU 50) are directly associated with the navigation filter as described below.

A Kalman filter is an optimal estimator for linear models driven by white Gaussian noise, where the filter provides estimates for state variables, preferably contained within a state vector. The Kalman filter typically includes a measurement model and a process model. The measurement model relates filter inputs to the state variables, while the process model relates the state variables to filter outputs. New states or predictions, $xp_n$, for the filter state variables of a state vector, x, and new states or predictions, $Pp_n$, for uncertainties of the new states or predictions $xp_n$ are determined by a Kalman filter based on the following.

$$xp_n = Fx_{n-1} + w \quad \text{(Equation 1)}$$

$$Pp_n = FP_{n-1}F^T + Q \quad \text{(Equation 2)}$$

where F is a transition matrix of relations (or equations) to propagate or predict the states and corresponding uncertainties forward in time, $x_{n-1}$ are the prior values of the state vector, $P_{n-1}$ are the uncertainties for the prior state vector $x_{n-1}$, w is a white noise matrix, and Q is the second moments of Browning Motion increments.

Once the new states or predictions are produced, a Kalman gain, K, is determined as follows.

$$K_n = Pp_n H^T (HPp_n H^T + R)^{-1} \quad \text{(Equation 3)}$$

where $Pp_n$ are the predicted uncertainties described above, H is a spatial observation matrix with transformations between measurement and estimation spaces (for the varying lines of sight), and R is second moments for measured noise. The Kalman gain is utilized by the Kalman filter to update the state vector, $x_n$, and corresponding uncertainties, $P_n$, based on current measurements as follows, where the Kalman gain basically weights the predictions (or new states) and measurements to control the contributions by these items to the filter result.

$$x_n = xp_n + K_n(z_n - H(xP_n)) \quad \text{(Equation 4)}$$

$$P_n = (I - K_n H)Pp_n \quad \text{(Equation 5)}$$

where $xp_n$ is the predicted state vector as described above, $K_n$ is the Kalman gain, $z_n$ is the current measurement, H is the observation matrix described above, I is the identity matrix and $Pp_n$ are the uncertainties for the predicted state vector as described above.

Since the process model for the received GPS signal is highly nonlinear in navigation system 10, the Extended Kalman Filter operates in a suboptimal region. Accordingly, the Extended Kalman Filter is designed to satisfy the conventional Orthogonal Projection theorem. In order to provide an optimal state estimate with minimum uncertainty, one of the suitable candidates for the signal estimation includes the variable bandwidth Particle Filter. This type of filter may be implemented by pre-filters 42 and provides estimation performance under these conditions that very closely approaches the theoretical limits of the conventional Cramer Rao Lower Bound (CRLB) information threshold.

Pre-filters 42 include a bank of Kalman type filters estimating the error in the early, prompt, and late I and Q measurements for each GPS signal being tracked by GPS receiver 20. Pre-filter properties are embedded in recursive implementations of conventional Monte Carlo based statistical signal processing performed by the pre-filters (e.g., as specified in the filter measurement and/or process models). Pre-filters 42 have been configured to provide optimal solution approximations that improve performance in real-time. The pre-filters each receive corresponding outputs from autocorrelation function unit 24 of GPS receiver 20. These signals (e.g., early, prompt and late signal component (I and Q) versions) are associated with a corresponding GPS signal being tracked and provided into high rate pre-filters 42 (e.g., 50-1 k Hz). The pre-filter samples the signals from the autocorrelation function unit at a high rate of about 50-1 k Hz to provide error estimate information to the navigation filter at a lower rate (e.g., 1 Hz), thus maintaining measurement independence for optimal operation viewed by the navigation filter. The pre-filters collapse or compress the I and Q samples over a cycle into a residual vector for each satellite being tracked and further produce the covariance for each satellite. This information is utilized by the navigation filter to produce an error state vector to correct IMU measurements for a navigation solution as described below.

The pre-filters further receive inputs from inertial compensation unit 48 and Gaussian regulator 49. The inertial compensation unit compensates for errors due to inertial sensors, while Gaussian regulator 49 provides optimal stochastic control gains as described below. The outputs from the inertial compensation unit and regulator collectively provide an optimal stochastic control law as described below, and are combined for application to the outputs from autocorrelation function unit 24.

By way of example, the estimated pre-filter states (within a state vector 'x' including elements x1-x5) include: x1—Geometric Carrier phase error (radians); x2—Geometric Carrier phase rate error (radians/sec); x3—Pseudorange bias error (meters); x4—Ionospheric—TEC error (cycles$^2$/meter); and x5—L1 Signal (from satellite) amplitude error (volts).

Pre-filters 42 produce estimates of carrier phase error and corresponding derivatives, range error and signal amplitude error for various signals (e.g., L1, L2 and L2C). These state estimates are converted to produce as filter outputs pseudorange (PR) error and delta range (DR) error values for transference to navigation filter 44 in order to implement a UTC type scheme as described below. In other words, pre-filters 42 process the correlator outputs and provide estimates of the Doppler frequency error (derived from the pseudorange rate error), range error (derived from the carrier phase error) and their corresponding uncertainties for the signal. Specifically, each pre-filter 42 is associated with a Line of Sight (LOS) and uses linear combinations of the error states in the state vector to produce estimates of pseudorange error ($\Delta R$) and corresponding variance (VAR($\Delta R$)), and pseudorange rate error ($\Delta \dot{R}$) and corresponding variance (VAR($\Delta \dot{R}$)). Each pre-filter further provides new information to navigation Kalman filter 44 (FIG. 1) at an approximate rate of 1 Hz. The measurement and process models for the Kalman pre-filters include conventional equations to relate the state variables to the filter input and output values. For examples of these types of equations, reference is made to aforementioned U.S. Pat. No. 6,516,021 (Abbott et al.).

The high data rate outputs of pre-filters 42 are provided to navigation filter 44. This filter serves as an integrating Kalman type navigation filter and operates at a lower rate when configured with a feedback loop (e.g., 'FB Loop 1' as viewed in FIG. 1) from navigator 46 (e.g., this depends upon the presence or absence of Inertial Measurement Unit (IMU) 50 connected to navigator 46 and the dynamics of a vehicle or other motion source). The navigation filter uses the estimates of the Doppler error (derived from the pseudorange rate error) and pseudorange error from pre-filters 42, and measurements from sensor module 60 to develop corrections for a strapdown navigation solution produced by navigator 46 as described below. Basically, a strapdown system includes a sensor unit with stationary sensors mounted in body coordinates (or the body frame of a vehicle or other source of motion). The orientation of the sensor unit providing the measurements is maintained and rotated from the body frame to a navigational frame by a digital signal or other processor utilizing conventional transformations (or equations). The outputs of navigation filter 44 provide corrections for a navigation solution based on the IMU sensors and include estimates of: position error, velocity error, orientation error, and receiver or time based parameter errors (e.g., inertial corrections of GPS receiver 20, receiver clock bias, and drift). The receiver clock bias and drift parameters are common to all the satellites observed.

By way of example only, the navigation Kalman filter state vector 'x' (with elements x1-x21) includes: x1-x3→position error in the local geographic frame; x4-x6→velocity error in the local geographic frame; x7-x9→tilt error in the local geographic frame; x10-x12→receiver clock bias, clock drift, and clock drift rate; x13-x15→oscillator gravity sensitivity in the body frame; x16-x18→accelerometer bias error in the body frame; and x19-x21→gyroscope bias error in the body frame. In addition, the navigation filter initialization values for each of the states listed above (elements x1-x21) are presented, by way of example, in Table 1 below. The units of the values in the table represent variances of the corresponding parameters.

TABLE 1

Navigation Filter Initialization

| Function | States | Value |
|---|---|---|
| Position | x1-x3 | 100 (m)$^2$ |
| Velocity | x4-x6 | 25 (m/s)$^2$ |
| Tilt | x7-x9 | $1.22 \times 10^{-3}$ (radians)$^2$ |
| Clock Bias | x10 | 100 (m)$^2$ |
| Clock Drift | x11 | 25 (m/s)$^2$ |
| Clock Drift Rate | x12 | $1 \times 10^{-6}$ (m/s$^2$)$^2$ |
| Clock Gravity Sensitivity | x13-x15 | $5 \times 10^{-5}$ ((m/s)/(m/s$^2$))$^2$ |
| Acceleration Bias | x16-x18 | $1 \times 10^{-6}$ (m/s$^2$)$^2$ |
| Gyro Bias | x19-x21 | $1 \times 10^{-6}$ (radians)$^2$ |

The strapdown navigation solution provided by navigator 46 is utilized to re-compute and appropriately scale the range and carrier phase errors, and provide feedback of these parameters to the receiver code and carrier tracking loops to determine the residuals (or errors) as described below.

Digital signal processor 40 performs various digital signal processing (DSP) algorithms, preferably designed for high-end navigational equipment to acquire and track GPS satellites as described herein. The digital signal processor initially performs a search for satellites in view, or ascertains estimates of which satellites are visible (when valid almanac information and approximate receiver position and time are available), and attempts to acquire the signals from those satellites. In the presence of Inertial Measurement Unit (IMU) 50, the digital signal processor is configured to account for the presence of the highly accurate IMU system. In this case, the IMU is responsible for providing a high rate feedback of the errors in velocity and position that translate into carrier phase and code errors. These errors are used to generate the corresponding replica signals as described below. The navigation filter may operate at a lower rate (e.g., 1 Hz) and is used to correct the IMU measurements as described below. In this configuration, the code and carrier signal tracking loops have a very small bandwidth since the IMU measurements are used to update and form the replica signals, while the low rate GPS navigation measurements are used to calibrate the IMU.

Figure 3:
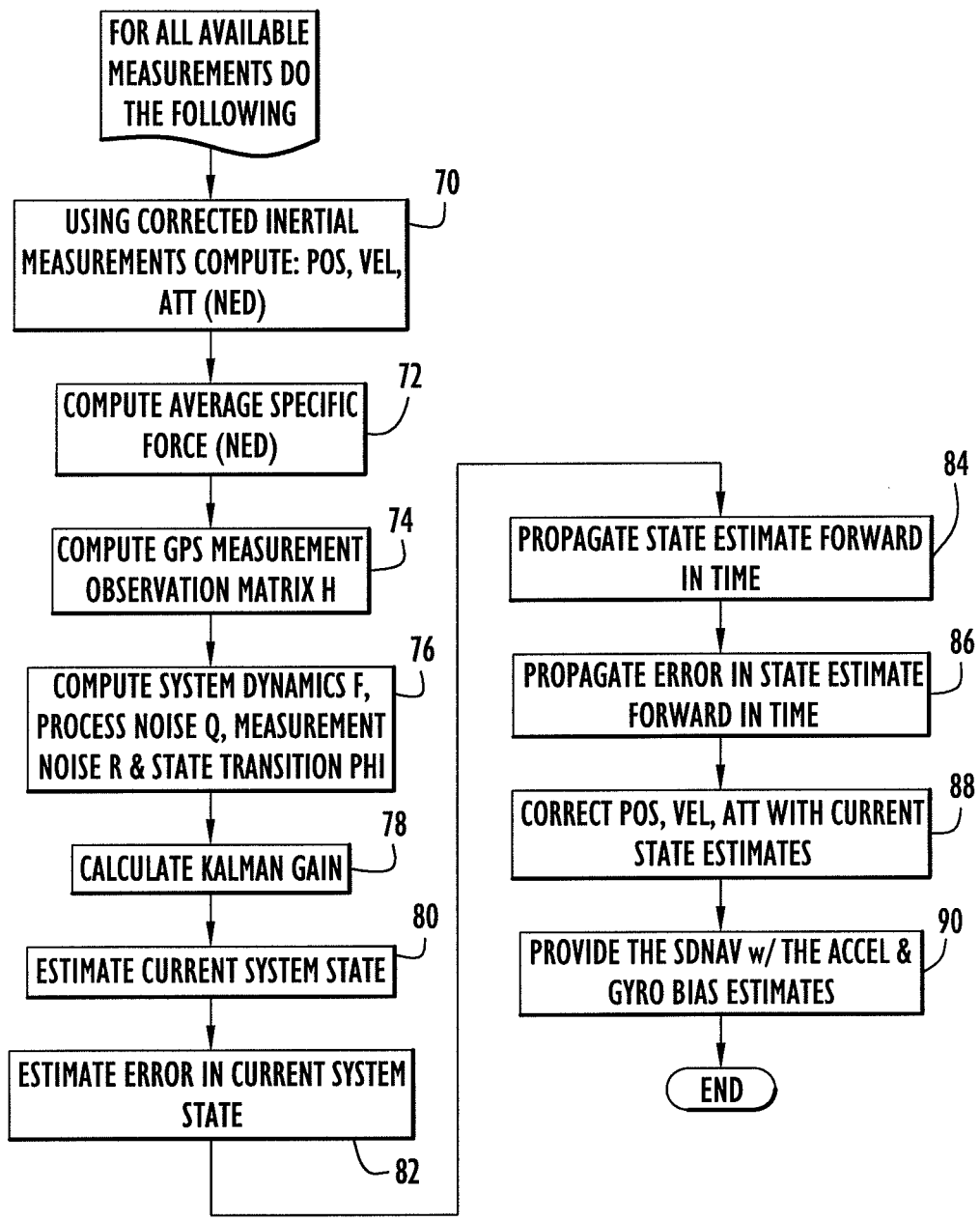
FIG. 3 is a procedural flowchart illustrating the manner in which the navigation filter of FIG. 1 processes information to produce corrections for inertial instruments according to an embodiment of the present invention.

The manner in which navigation filter 44 produces corrections for the strapdown navigation solution is illustrated in FIG. 3. Specifically, navigation filter 44 (FIG. 1) receives the information from pre-filters 42, sensor measurements from sensor module 60 and the navigation solution from navigator 46 and initially determines the position, velocity and attitude based on corrected inertial measurements (of IMU 50) from navigator 46 at step 70. These items are determined with reference to the North-East-Down (NED) frame. The navigation solution from navigator 46 is supplied to navigation filter 44 by a feedback loop (e.g., 'FB Loop 1' as viewed in FIG. 1). This feedback loop provides motion information from navigator 46 to navigation filter 44 in order to update the navigation filter dynamics.

Navigation filter 44 further computes the average specific force with reference to the NED frame at step 72. The specific force relates to accelerations (e.g., measured by inertial sensors), and is utilized to determine various characteristics (e.g., velocity, position, etc.). Basically, the inertial instruments sense linear and rotational forces (e.g., in the form of accelerations) related to motion. The force may be time integrated to determine velocity, while a second time integration provides position and orientation. The specific force may be utilized within the Kalman filter (e.g., process and/or measurement models) to assist in determining the navigation corrections (e.g., via conventional relationships or equations).

The GPS measurement observation matrix, 'H', is determined at step 74, and includes the transformations for the respective lines of sight. The observation matrix may be determined as follows.

$$H_{PR(i)} = [L_{SVxyz}{}^n (L_{SVxyz}{}^n \Delta t_R)_{1\times 3} 0_{1\times} -1 -\Delta t_R 0_{1\times 10}]$$

$L_{SVxyz}{}^n$: LOS unit vector from user antenna to satellite $\Delta t_R$: Time elasped from the last covariance propagation to time of current measurement i=1, 2, . . . N where N is the number of satellites tracked The system dynamics matrix, F, process noise matrix, Q, measurement noise matrix, R, and state transition, Φ, are further determined at step 76. The state transition may be utilized within the Kalman filter (e.g., process and/or measurement models) to assist in determining the navigation corrections (e.g., via conventional relationships or equations). The system dynamics matrix, F, includes the relations (or equations) to propagate or predict the state variables of state vector, x, forward in time as described below and may be represented as follows.

$$F_{21\times 21} = \begin{bmatrix} F_{INS9\times 9} & 0_{9\times 6} & F_{FB19\times 6} \\ 0_{6\times 9} & F_{CLOCK6\times 6} & 0_{6\times 6} \\ 0_{6\times 9} & 0_{6\times 6} & F_{INERTIAL6\times 6} \end{bmatrix}$$

The system dynamics matrix, F, computes the terms that are used to measure navigation systems performance based on the system entities that pre-dominantly affect the position error. These system entities are identified based on their statistical distribution, mutual correlation (e.g., feedback in the matrix $F_{FB1\ 9\times 6}$) and clock drift estimates (e.g., represented by the matrix $F_{Clock\ 6\times 6}$). The sub-matrices within the systems dynamic matrix, F, are illustrated below, where the size of the sub-matrices are indicated by the corresponding subscripts.

| | $f_i$ | | |
|---|---|---|---|
| j | 2 3 4 5 6 7 8 9 | 10 11 12 13 14 15 | 16 17 18 19 20 21 |
| 2 | $F_{INS\ 9\times 9}$ | $0_{9\times 6}$ | $F_{FB1\ 9\times 6}$ |
| 3 | | | |
| 4 | | | |
| 5 | | | |
| 6 | | | |
| 7 | | | |
| 8 | | | |
| 9 | | | |
| 10 | $0_{6\times 9}$ | $F_{Clock\ 6\times 6}$ | $0_{6\times 6}$ |
| 11 | | | |
| 12 | | | |
| 13 | | | |
| 14 | | | |
| 15 | | | |
| 16 | $0_{6\times 9}$ | $0_{6\times 6}$ | $F_{Iner\ 6\times 6}$ |
| 17 | | | |
| 18 | | | |
| 19 | | | |
| 20 | | | |
| 21 | | | | where $F_{INS}$ represents a matrix for the Inertial Navigation System (INS) and employs a Pinson Model as described below, $F_{CLOCK}$ represents a matrix for clock drift estimates, $F_{FB1}$ represents a matrix for the feedback loop between navigator 46 and navigation filter 44, and $F_{INER}$ represents a matrix for the sensor module.

By way of example, the INS matrix, $F_{INS}$, may be implemented by a standard Pinson Model that accounts for the Coriolis factor and describes relationships between the transport rate skew matrix and the frame transformations from Earth to navigation and from inertial to navigation. The Coriolis factor (e.g., Theorem of Coriolis) mathematically describes the relationship between two frames of reference and their relative angular rotation to the time rates of change in the same two coordinate systems. The Coriolis expression used in the INS matrix, $F_{INS}$, is as follows.

$$(\omega_{en}{}^n + 2\omega_{ie}{}^n) \otimes$$

where $\omega_{en}{}^n$ is the transport rate from the Earth frame to the navigation frame (e.g., the rate of turn of the navigation frame with respect to an Earth fixed frame), $\omega_{ie}{}^n$ is the Earth rate from the inertial frame to the navigation frame, and the symbol $\omega_{ie}{}^n \otimes$ (D represents the skew-symmetric form of the Earth's rotation rate vector at the location of interest (navigation frame).

The process noise matrix, Q, represents the dynamic computation of process noise as a function of motion and statistically measured parameters of inertial sensors, and commercially available clocks (e.g., temperature controlled crystal oscillators, cesium, rubidium, etc.) and may be expressed as follows.

$$Q = \begin{bmatrix} Q_{INS} & 0 & 0 \\ 0 & Q_{CLOCK} & 0 \\ 0 & 0 & Q_{SENSOR} \end{bmatrix}$$

where $Q_{INS}$ represents a noise matrix for the Inertial Navigation System (INS) including IMU 50, $Q_{CLOCK}$ represents a noise matrix for the clock, and $Q_{SENSOR}$ represents a noise matrix for sensor module 60. The process noise matrix, Q, is utilized to determine uncertainties for predicted states as described below.

The measurement noise covariance matrix, R, is a function of the ratio of the noise power spectral density (PSD) and the sampling interval that is scaled by the signal power. Thus, the navigation filter is a dynamically tuned Kalman filter for the observation process. The entries in the measurement noise covariance matrix, R, include the following.

$$V = \begin{bmatrix} v_{Ie} \\ v_{Ip} \\ v_{Il} \\ v_{Qe} \\ v_{Qp} \\ v_{Ql} \end{bmatrix}$$

$$R = E[VV^T]$$

$$R = \frac{\sigma^2}{x^5} \begin{bmatrix} 1 & 1-\delta & 1-2\delta & 0 & 0 & 0 \\ 1-\delta & 1 & 1-\delta & 0 & 0 & 0 \\ 1-2\delta & 1-\delta & 1 & 0 & 0 & 0 \\ 0 & 0 & 0 & 1 & 1-\delta & 1-2\delta \\ 0 & 0 & 0 & 1-\delta & 1 & 1-\delta \\ 0 & 0 & 0 & 1-2\delta & 1-\delta & 1 \end{bmatrix}$$

$$\delta = \frac{\lambda_M}{8},$$

$$\sigma^2 = \frac{\text{Noise } PSD}{2\text{Sampling } interval}$$

where noise vector, V, includes elements representing the measured noise for early, prompt and late signal component (I and Q) versions, $x_5$ represents the signal amplitude, $\sigma^2$ represents the ratio of the power spectral density (PSD) divided by twice the sampling interval, and $\delta$ represents the resolution of the measurement which is the wavelength $\lambda_M$ divided by eight (where the index represents a code to indicate the signal, such as L1, L2 and L2C). This expression may be applied to both commercial and military codes. The measurement noise matrix, R, is utilized to determine the Kalman gain as described below.

The Kalman gain may be computed at step 78 based upon the observation matrix, H, the measurement noise matrix, R, and the uncertainties for predicted states (e.g., in a manner similar to Equation 3 described above). The current system state and corresponding errors in the system state are respectively determined at steps 80, 82 (e.g., in a manner similar to Equations 4 and 5 described above), where the initial values of the state variables may be utilized initially to determine system state information. The state and error estimates are propagated or predicted forward in time at respective steps 84, 86 (e.g., in a manner similar to Equations 1 and 2 described above).

The propagated state estimates are utilized to correct the position, velocity and attitude errors at step 88 (e.g., in a manner similar to Equations 1 and 2 described above), where measurements from sensor module 60 are preferably used to determine the actual error in the inertial measurements. The process and measurement models of the Kalman filter preferably include conventional relations or equations relating the state variables to filter inputs and outputs. The acceleration and gyro bias estimates (e.g., elements $x16$-$x21$ of the predicted state vector) are provided to the input of the navigator at step 90. The navigation filter further feeds back the adjusted motion information to pre-filters 42 (e.g., 'FB Loop 2' as viewed in FIG. 1). This feedback loop provides estimation errors to enable the signal estimation to have knowledge of the kinematics of the source of motion (e.g., vehicle, hand-held unit, etc.).

Navigator 46 constantly receives the corrections from navigation filter 44, thereby providing corrections to de-weight errors received from inertial instruments of IMU 50. In other words, navigator 46 applies the estimates received from navigation filter 44 to measurements from IMU 50 to produce a resulting navigation solution. Navigator 46 is preferably implemented by a High Fidelity World Geodetic System (WGS-84) type Strapdown Inertial Navigator. A strapdown system basically includes an IMU with stationary sensors (e.g., accelerometers and gyros) mounted in body coordinates (or the body frame of a vehicle, hand-held unit or other source of motion) as described above. The orientation of the IMU providing the measurements (and corresponding vehicle or motion source) is maintained and rotated from the body frame to a navigational frame by a digital signal or other processor utilizing conventional transformations (or equations). WGS-84 represents information used to determine altitude above a reference ellipse. This information is based on an origin at the center of the Earth and the reference ellipsoid defined by major and minor axes of the Earth (e.g., provided by data from various sources known in 1984). The information is used to implement an Earth model that is utilized to determine the navigation solution, preferably based on conventional navigation relations (or equation derivations).

Figure 4:
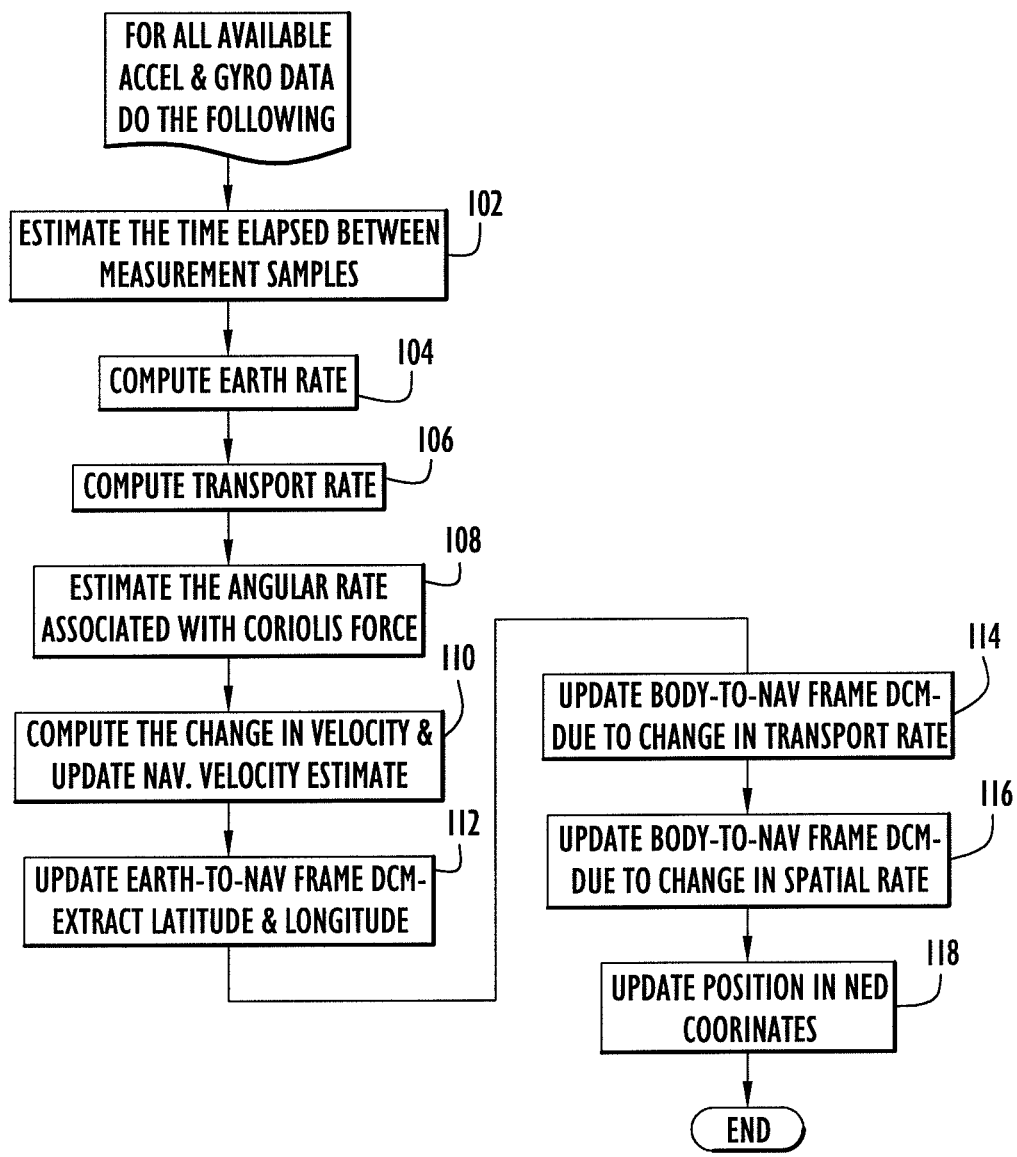
FIG. 4 is a procedural flowchart illustrating the manner in which the navigator of FIG. 1 processes the correction information to produce navigational information according to an embodiment of the present invention.

The manner in which navigator 46 produces the navigation solution is illustrated in FIG. 4. Initially, the navigator utilizes the measurements from IMU 50 (e.g., gyros and accelerometers) to determine the navigation solution, where the accelerometer and gyro bias estimates from navigation filter 44 are applied to the processing of the IMU measurements. Specifically, the navigator estimates the elapsed time between measurement samples from IMU 50 at step 102 and determines the Earth rate at step 104 based on the elapsed times, measurements and WGS-84 information. This may be determined by conventional relationships (or equation derivations). The navigator further determines the transport rate (or rate of turn of the navigation frame with respect to an Earth fixed frame) at step 106 based on the elapsed time and measurements, and estimates the angular rate associated with the Coriolis force at step 108 in accordance with the Earth model and corresponding information.

The Coriolis theorem basically indicates that the velocity of an object in a non-rotating frame is determined from the ground speed and an additional amount of speed due to rotation of the Earth. The change in velocity of the navigation system is determined based on the determined rates (e.g., Earth, transport, angular, etc.) and elapsed time, and a velocity estimate determined from the IMU measurements is updated at step 110. Navigator 46 utilizes Direction Cosine Matrices (DCM) to translate between the various reference frames (e.g., Earth to navigation, body to navigation, etc.). These matrices may utilize conventional relations (or equation derivations) for the transformations. Accordingly, the Earth to navigation frame DCM is updated based on the measurements and prior determinations (e.g., rates, velocity, etc.), and latitude and longitude information for the navigation system are extracted at step 112. The navigator further updates the body to navigation frame DCM based on the changes in transport rate and spatial rate at respective steps 114, 116, and updates the position in the NED frame at step 118 based on the updated matrices and extracted latitude and longitude information. The estimated errors or corrections (e.g., for position, velocity, tilt, etc.) from navigation filter 44 are applied to the navigation information determined from IMU measurements to produce the resulting navigation solution (e.g., position, velocity, orientation, time or clock parameters, etc.).

Information from the resulting navigation solution (e.g., position, velocity, orientation, time or clock parameters, etc.) is provided via a feedback loop to navigation filter 44 (e.g., 'FB Loop 1' as viewed in FIG. 1) as described above. The information (e.g., time or clock parameters, etc.) is further fed back to oscillator 26 of GPS receiver 20 (e.g., 'FB Loop 3' as viewed in FIG. 1) to control generation of the replica signal supplied by the oscillator to autocorrelation function unit 24 for tracking. This establishes a link between platform motion and signal arrival times, thereby continuously modulating the correlation process for the pseudorange and delta range measurements and mechanizing the ultratightly coupled architecture of the navigation unit. The navigation information (e.g., position, velocity, orientation, time or clock parameters, etc.) is provided to inertial compensation unit 48 and Gaussian regulator 49 to reduce inertial error growth rate of the inertial instruments and apply optimal control as described below.

Figure 5:
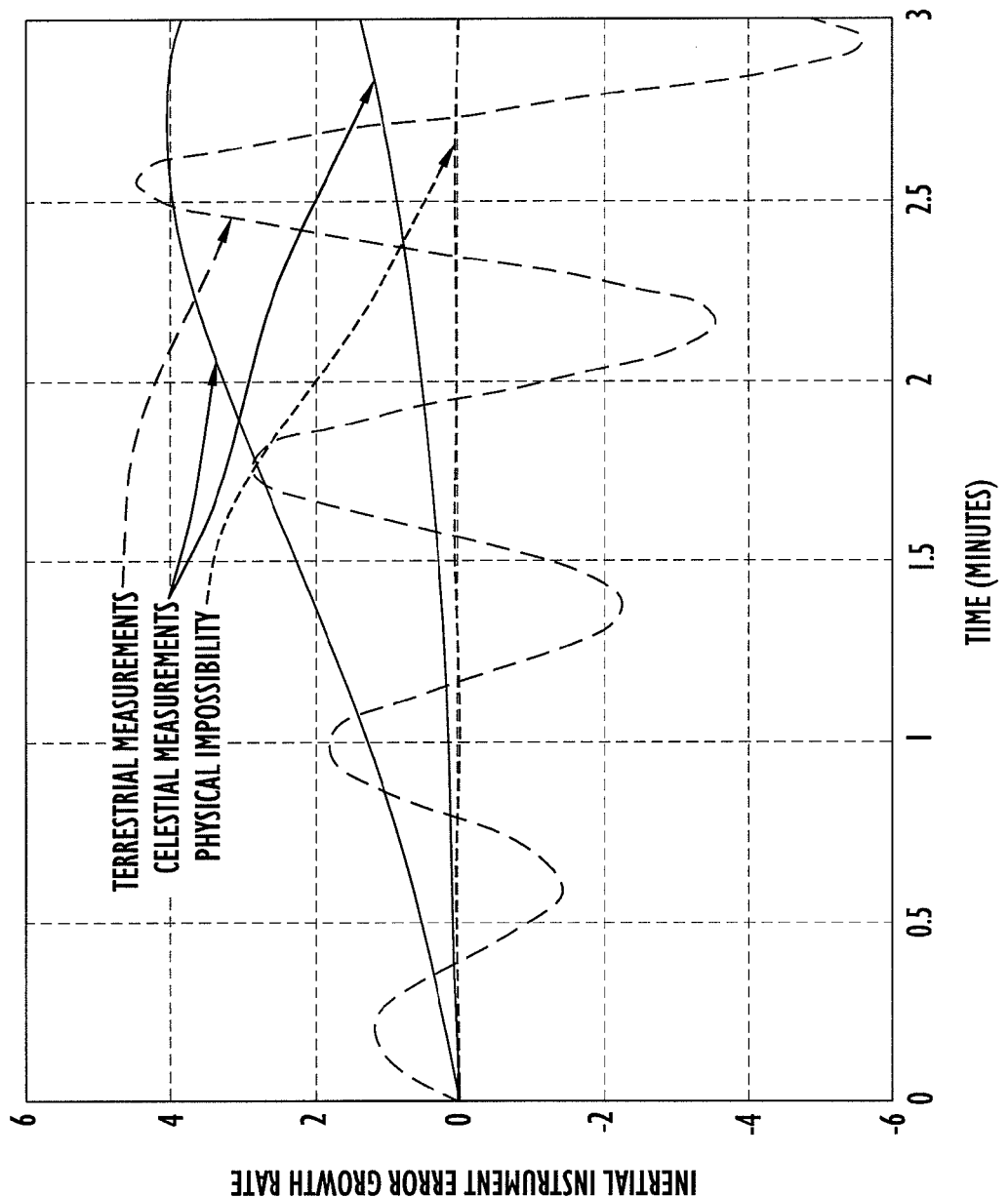
FIG. 5 is a graphical plot illustrating an example error growth rate of sensor measurements due to gravity.
Figure 6:
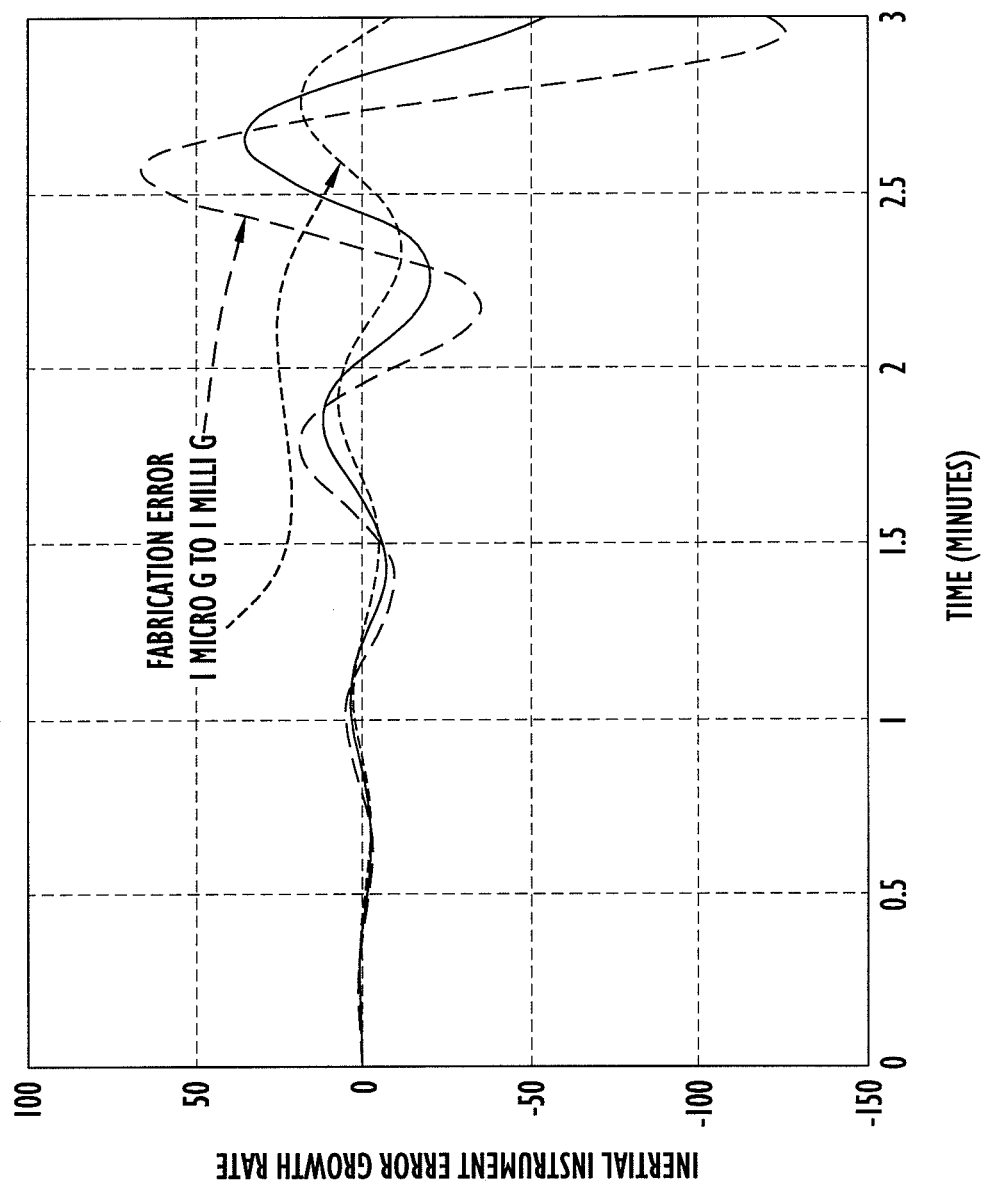
FIG. 6 is a graphical plot illustrating an example error growth rate of sensor measurements due to fabrication errors.

Inertial compensation unit 48 mitigates errors that occur due to the inertial sensors within IMU 50. The inertial compensation unit compensates for cumulative errors originating in the sensors (e.g., accelerometers and gyros) of IMU 50 with an improvement of approximately 66%. Basically, inertial sensors are bounded by certain behaviors. Navigation system 10 mitigates some of the natural effects on these inertial instruments. Specifically, FIGS. 5-6 illustrate simulation results of error growth behavior. This error growth behavior is a composite effect of an exponentially increasing function and a sinusoidal oscillation. The exponential growth is a function of errors in the fabrication of an inertial instrument and an effect that is governed by the physical laws of the universe. The time constant of various exponential growth phenomena is a function of the inertial instrument quality. For example, error growth in expensive sensors increase over longer time intervals in comparison to cheap MEMS sensors. This time constant may be controlled by engineering techniques to limit the error growth rate for a longer time interval.

Figure 7:
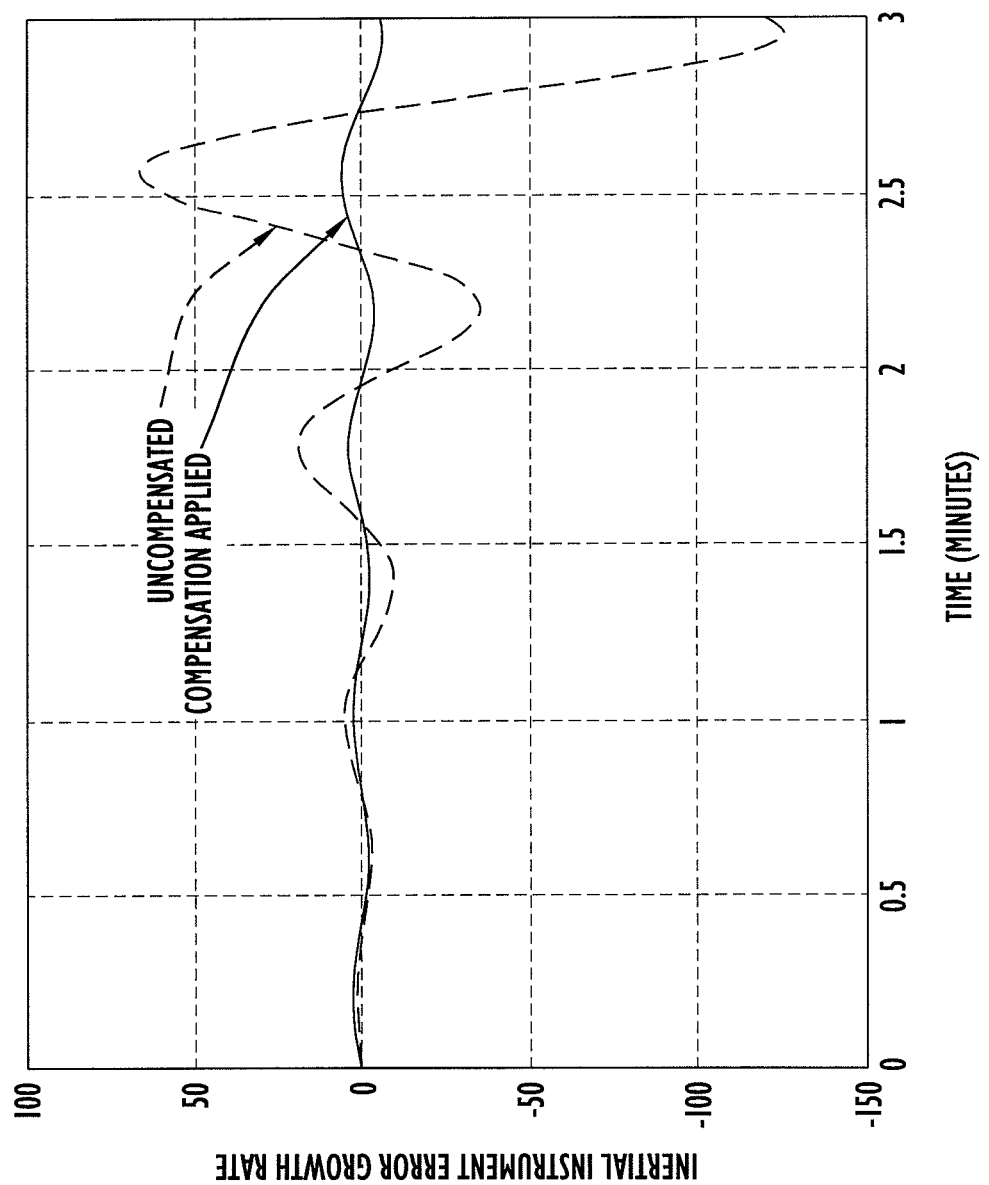
FIG. 7 is an example graphical plot illustrating an error growth rate compensated by the navigation system of FIG. 1 and a conventional uncompensated error growth rate.

Referring to FIG. 5, the spatial effects (frequency) in various environments (e.g., terrestrial/celestial environments) sensed by inertial instruments are illustrated as a function of gravity. Inertial instruments sense linear and rotational forces (e.g., accelerations) related to sensor motion. The force may be time integrated to determine velocity, while a second time integration provides position and orientation. FIG. 6 illustrates inertial error growth rate inherent in the fabrication of auxiliary sensors (e.g., accelerometers) and the significant harmonics as time progresses. However, navigation system 10 minimizes these harmonics due to inertial compensation unit 48 as described below. A comparison of an uncompensated error growth rate and an error growth rate compensated by inertial compensation unit 48 are illustrated in FIG. 7. As viewed in FIG. 7, a pronounced improvement is illustrated for the results produced by use of the inertial compensation unit. However, the oscillatory component of this behavior measured by inertial instruments is maintained.

Inertial compensation unit 48 receives information (e.g., position, velocity, orientation, time or clock parameters, etc.) from navigator 46 via a feedback loop (e.g., 'FB Loop 4' as viewed in FIG. 1). This feedback loop enables reduction of free inertial error growth rate of the instruments of IMU 50, thereby resulting in increased performance. The inertial compensation unit performs a technique referred to herein as Pole Placement. Basically, the physical parameters of the Earth (e.g., gravitational force and the size and shape of the Earth) create instabilities. Since these instabilities may be exhibited as two complex conjugate poles on the real side of the S-plane, the system generates positive eigenvalues or, in other words, is unstable. Inertial compensation unit 48 mitigates this instability, and thereby provides a stable navigational system.

In particular, inertial compensation unit 48 reshapes the closed loop dynamics of the system that further mitigates the open loop unstable dynamics. This theory is based on the fact that a single axis vertical channel inertial navigation system is a positive feedback control system that is inherently unstable. This unstable condition is demonstrated using Einstein's Principle of Equivalence (PoE). Basically, the sensor is unable to separate the force due to gravity from the force due to sensor motion. The inertial compensation unit mitigates or bounds the adverse effects of gravity on the measurements to provide a stable system. The transfer function of the inertial compensation unit, $TF_{IC}$, includes four poles in the S-plane with two poles on the imaginary axis and two poles on the real axis as described below. The two sets of poles are mirror images of each other relative to the origin in the complex S-plane. However, the distance from the origin for the poles on the real axis is twice that of the distance from the origin for the poles on the imaginary axis, where the magnitudes are the square roots of the ratios of gravity to the planet radius.

Figure 8:
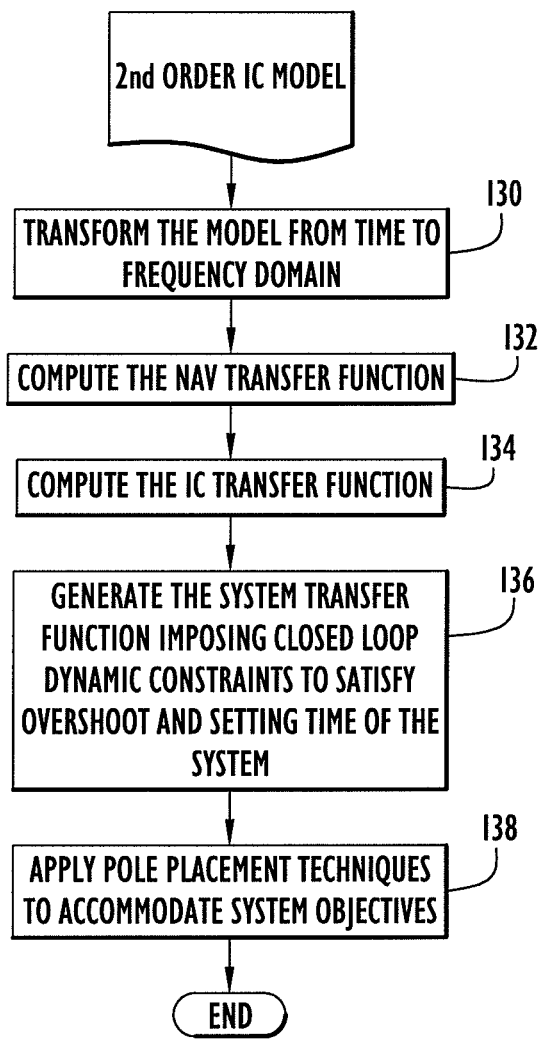
FIG. 8 is a procedural flowchart illustrating the manner in which the inertial compensation unit of FIG. 1 compensates for inertial measurement errors according to an embodiment of the present invention.

The manner in which inertial compensation unit 48 compensates for sensor errors is illustrated in FIG. 8. Specifically, the inertial compensation unit initially utilizes a second order model of the inertial compensation within the time domain. However, models of other orders may similarly be used. Specifically, the inertial compensation unit transforms the model from the time domain to the frequency domain at step 130, and determines the transfer function for navigator 46 at step 132. The inertial compensation unit further determines the inertial compensation transfer function, $TF_{IC}$, at step 134 based on the second order model.

A navigation unit transfer function is generated at step 136 based on the navigator and inertial compensation transfer functions. The navigation unit transfer function is generated by imposing closed loop dynamic constraints to satisfy overshoot and settling time of the navigation unit. Once the navigation unit transfer function is determined, pole placement techniques are applied to tune the inertial compensation unit transfer function, thereby adjusting the navigation unit transfer function to accommodate desired objectives. In effect, the inertial compensation transfer function applies the pole placement within the navigation unit transfer function to mitigate sensor errors and control error growth. An exemplary transfer function of the inertial compensation unit, $TF_{IC}$, may be expressed as follows, where the coefficients may be adjusted for tuning of the model.

$$TF_{IC} = \frac{s^2 + 2.6s + 6.8}{(s^2 + 0.8)(s^2 + 0.35) + 1}$$

The resulting transfer function of the inertial compensation unit is applied to the navigation information from navigator 46 (e.g., position, velocity, orientation, time or clock parameters, etc.). The inertial compensation unit basically bounds the errors from the inertial sensors to provide a stable system as described above, and consequently bounds the information from the navigator based on the applied transfer function. Since the navigation unit transfer function is determined, the inputs providing the bounded navigation information may be determined in order to produce adjustments for the outputs from autocorrelation function unit 24.

Regulator 49 provides plant regulation and fast signal recovery (in response to signal availability after a signal loss) by implementing an optimal stochastic control law process. The stochastic control law improves signal recovery by approximately one order of magnitude. For example, signal recovery time with regulator 49 may be on the order of one minute compared with 12-15 minutes (without regulator 49) when the signal re-appears within five minutes of satellite signal loss.

Figure 9:
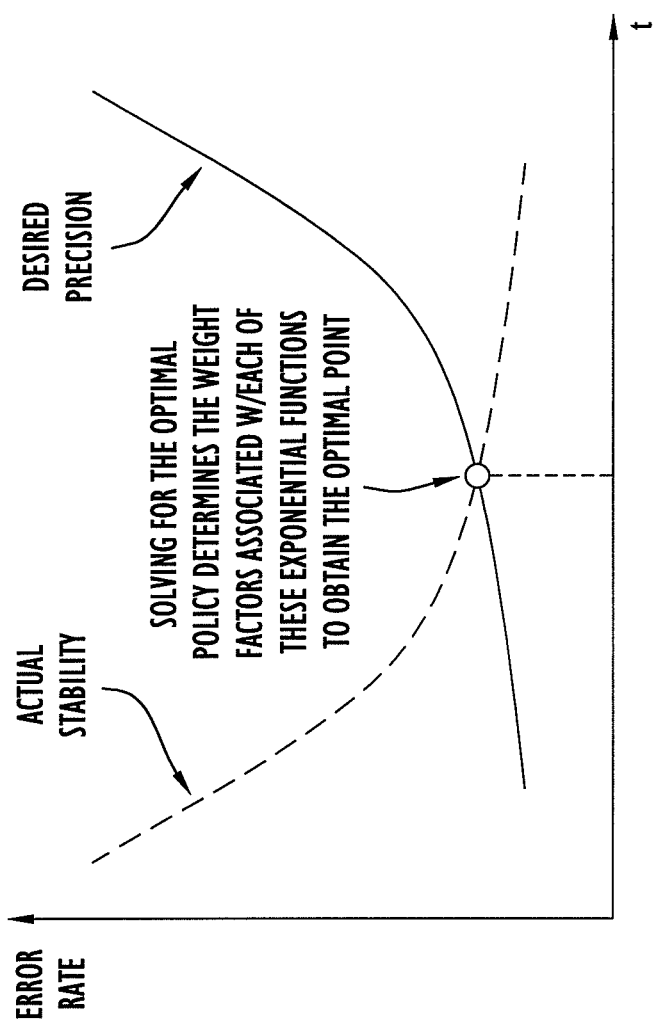
FIG. 9 is an example graphical plot illustrating the optimization produced by the regulator of the system of FIG. 1 according to an embodiment of the present invention.

The regulator provides an optimal solution to balance conflicting requirements between system stability and precision as illustrated in FIG. 9. Regulator 49 determines weight factors associated with each of the stability and precision functions to provide an optimum policy. The regulator is preferably designed in phases. In particular, a linear quadratic regulator (LQR) is designed along with an optimal stochastic observer that is essentially a steady state Kalman filter. The phases may be designed independently due to the separation theorem of control theory. A solution to determining the optimal control point for the plant between precision and stability is achieved by dynamically adapting the parameters of the transition or dynamics matrix, F, for navigation filter 44 to minimize the deviations of position and velocity within the navigation solution, thereby reducing a cost function described below.

Regulator 49 receives information from navigator 46 (e.g., position, velocity, orientation, time or clock parameters, etc.), and under marginal conditions and GPS signal loss, inherits full control authority over the plant for fast loop stabilization and rapid recovery purposes. The equations and the investigative development process start with defining the state space representation of pre-filters 42, navigation filter 44, and navigator 46. In particular, the state space representations of the pre-filters, the navigation filter and the navigator are as follows.

$$\dot{X}_{PF} = F_{PF}X_{PR} + B_{PF}u_{PF} + G_{PF}w_{PF}$$

$$\dot{X}_{NF} = F_{NF}X_{NF} + B_{NF}u_{NF} + G_{NF}s_{NF}$$

$$\dot{X}_{NV} = F_{NV}X_{NV} + B_{NV}u_{NV} + G_{NV}w_{NV}$$

The differential equations describing the plant (e.g., indicated by the 'P' subscript) in a state space form may be represented as follows.

$$\dot{X}_P = A_P X_P + B_P u_P + G_P w_P$$

where $A_p$ represents the system dynamics matrix of the plant and may be determined as follows.

$$A_P = \begin{bmatrix} F_{PF} & 0 & 0 \\ 0 & F_{NF} & 0 \\ 0 & 0 & F_{NV} \end{bmatrix}$$

$$Y = C_P X_P + v$$

The observable states of the plant are expressed in matrix Y, where $C_P$ is a matrix that defines the observable states of the partially observable state vector $X_p$, and v is the noise vector from the inertial instruments (e.g., IMU sensors).

The system dynamics matrix of the plant, $A_p$, includes the pre-filter process matrix, $F_{PF}$, the navigation filter process matrix, $F_{NF}$, and the strap down navigator system matrix, $F_{NV}$, to represent the diagonal of that matrix. The control signal vector, u, includes the I and Q measurements from the GPS receiver correlators combined with the control commands or gains from the LQGR process (and optionally the adjustments from the inertial compensation unit described above), and may be represented as follows.

$$u_P = \begin{bmatrix} u_{PF} \\ u_{NF} \\ u_{NV} \end{bmatrix}$$

The input gain control matrix, B, delineates the control signals directly affecting the plant and may have the following form.

$$B_P = \begin{bmatrix} B_{PF} & 0 & 0 \\ 0 & B_{NF} & 0 \\ 0 & 0 & B_{NV} \end{bmatrix}$$

where $B_{PF}$ is the gain control for the pre-filters, $B_{NF}$ is the gain control for the navigation filter, and $B_{NV}$ is the gain control for the navigator.

The noise matrix, w, is the total noise from the GPS receiver correlators and is controllable via the sample rate of the pre-filters. The pre-filter noise, $w_{PF}$, the navigation filter noise, $w_{NF}$, and the strap down navigator noise, $w_{NV}$, for the plant are expressed as follows.

$$w_P = \begin{bmatrix} w_{PF} \\ w_{NF} \\ w_{NV} \end{bmatrix}$$

The gain matrix, G, for the noise may be defined as follows.

$$G_P = \begin{bmatrix} G_{PF} & 0 & 0 \\ 0 & G_{NF} & 0 \\ 0 & 0 & G_{NV} \end{bmatrix}$$

where $G_{PF}$ is the gain for the pre-filters, $G_{NF}$ is the gain for the navigation filter, and $G_{NV}$ is the gain for the navigator.

The regulator initially observes the navigation solution from navigator 46, and estimates the state vector of the plant, $X_P$, using the optimal stochastic observer in accordance with the above equations. The state estimates for the observable states (including position and velocity), Y, are provided to the linear quadratic (Gaussian) regulator process that generates the optimal stochastic control gains. In particular, the linear quadratic regulator process of regulator 49 is based on the optimal control theory for operation of a dynamic system with a linear quadratic cost function that has been minimized. In other words, regulator 49 minimizes the following cost function to provide an optimal control solution.

$$J = \int_0^\infty [x^T Q x + u^T R u] dt$$

This cost function is defined in terms of the sum of the deviations of position and velocity from their desired values, where x and u are cost matrices for precision and stability functions (FIG. 9) based on the position and velocity deviations, and Q and R are their corresponding gain and weight matrices. The costs associated with the stability function decrease with the error rate over time as the system stabilizes, whereas the costs associated with the precision function increase with the error rate over time due to the error growth rate of the IMU sensors. Accordingly, the cost function is operated in a recursive fashion to obtain an optimal control system (e.g., minimum error rate common to both functions as viewed in FIG. 9) by adjusting associative weights Q and R (within the cost function), thereby providing an automated state-feedback controller auxiliary to the plant. The Q and R matrices in the cost function are specific to the regulator and include symmetric positive semi definite weighting matrices. A matrix, S, is positive definite if for a vector, x, with non-zero elements (x≠0), $x^T S x > 0$, and positive semi definite if $x^T S x \geq 0$. In other words, symmetric positive definite matrices have all positive eigenvalues (e.g., all eigenvalues greater than zero), while symmetric positive semi definite matrices have all eigenvalues nonnegative (e.g., all eigenvalues greater than or equal to zero).

The resulting weights or gains (Q and R) represent the optimal stochastic control gains and are combined with the adjustments from inertial compensation unit 48 and blended with the in phase and quadrature phase (I/Q) signal components of the early, prompt, and late, signals from GPS receiver 20. This provides an optimal stochastic control law, thereby regulating the filters implemented in pre-filters 42, navigation filter 44 and navigator 46. In addition, the combined signals propagate through the plant and affect the cost function described above for determining the optimal stochastic control gains. The inertial compensation unit and the regulator (and corresponding feedback loops as viewed in FIG. 1) basically adjust or control the operation of the plant UTC architecture to attain accurate navigational information in signal challenging environments and rapid re-acquisition of the satellite signal after signal loss.

In operation, the navigation system relies on the GPS measurements from the GPS receiver when the GPS signal is available. In this case, regulator 49 provides minor control and enables the system to operate based on the plant UTC scheme in order to track the satellite signals via the tracking loops and determine the navigation solution. However, when the GPS signal becomes unavailable or resides within a signal challenging environment, regulator 49 assumes primary control of the system and controls the plant to rely on the IMU measurements for tracking and determination of the navigation solution. Since the error growth rate of the IMU sensors increases with time (FIGS. 5-6), the inertial compensation unit bounds the error growth rate to mitigate the IMU sensor errors as described above, thereby providing navigational information with enhanced accuracy under these conditions. When the GPS signal becomes available, the tracking loops should be in the neighborhood of the received signal due to the bounded IMU measurements. Thus, the regulator controls the plant to quickly revert to the GPS measurements for tracking and navigation, thereby significantly improving the time to re-acquire the satellite signal.

It will be appreciated that the embodiments described above and illustrated in the drawings represent only a few of the many ways of implementing a navigation system and method of obtaining accurate navigational information in signal challenging environments.

The present invention embodiments may be utilized with any conventional or other GPS type receiver, or other receiving/transceiving devices utilizing signal tracking or searching capability to provide location information from various sources. The GPS receiver may include any quantity of any suitable conventional or other type of antenna. The RF/IF unit may be implemented by any conventional or other device and may utilize any conventional or other processes (e.g., signal conditioning, translation (e.g., down conversion), filtering, digitization, etc.) to generate in-phase (I), quadrature (Q) or other signals or signal components. The autocorrelation function unit may be implemented by any conventional or other device and may employ any conventional or other correlation processes. The autocorrelation function unit may provide any suitable versions of the signal time shifted by any desired amounts (e.g., prompt, early, late, etc.). The oscillator may be implemented by any conventional or other oscillator (e.g., NCO, etc.) to provide a signal. The oscillator may be controlled based on any suitable control signals (e.g., actual signal characteristics to produce a desired signal, signals to adjust the oscillator, etc.). The GPS receiver or other receiving/transceiving devices may include any combination of hardware and software to perform the desired functions.

The navigation unit may be disposed on any suitable platform (e.g., air, ground or sea vehicle, hand-held or transportable unit for ground users, etc.), where the receiver and navigation unit may be disposed locally or remotely from each other depending upon the particular application. The signal processor of the navigation unit may be implemented by any conventional or other processor and/or circuitry (e.g., microprocessor, controller, digital or other signal processor, logic circuits, circuitry, etc.). The signal processor may include any conventional or other hardware or processing units (with or without software units or modules) to perform the functions described herein.

It is to be understood that the software for the processors of the present invention embodiments (e.g., receiver, signal processor, etc.) may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The processors of the present invention embodiments may alternatively be implemented by any type of hardware and/or other processing circuitry. The various functions of the processors (e.g., autocorrelation, RF/IF, pre-filters, navigation filter, navigator, inertial compensation, regulator, etc.) may be distributed in any manner among any quantity of software modules or units, processor or computer systems and/or circuitry, where the computer or processor systems may be disposed locally or remotely of each other and communicate via any suitable communications medium. The software and/or algorithms described above and/or illustrated in the flow charts may be modified in any manner that accomplishes the functions described herein. In addition, the functions in the flow charts or description may be performed in any order that accomplishes a desired operation.

The software of the present invention embodiments (e.g., of the navigation unit, etc.) may be available on a program product apparatus or device including a recordable or computer usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The pre-filters may include any quantity of Kalman or other types of filters (e.g., estimators, etc.) to accommodate any quantity of tracked signals. Each pre-filter may accommodate any quantity of the tracked signals. The state vectors of the pre-filters may include any quantity of any suitable state variables representing desired parameters, measurements or characteristics (e.g., measurement or parameter errors, actual measurement or parameter values, etc.). The process and measurement models may include any conventional or other equations to relate the state variables to the inputs and outputs, and perform any suitable algorithms (e.g., particle filters, etc.). The pre-filters may utilize any suitable inputs (e.g., feed back or input from any other navigation unit or receiver components, etc.) and produce any suitable outputs for the navigation filter based on the process and measurement models. The pre-filters may employ any conventional or other equations within the systems dynamics matrix, where this matrix may include any suitable dimensions. The pre-filters may employ any suitable conventional or other functions or measurements for the noise and uncertainties matrices (e.g., Q, R, w, etc.), where these matrices may include any suitable dimensions. The pre-filter state variables may be initialized to any suitable values. The outputs of the pre-filters may be provided with respect to any suitable units or reference frames.

The navigation filter may include any Kalman or other type of filter (e.g., estimator, etc.). The state vector of the navigation filter may include any quantity of any suitable state variables representing desired parameters, measurements or characteristics (e.g., representing measurement or parameter errors, actual measurement or parameter values, etc.). The process and measurement models may include any conventional or other equations to relate the state variables to the inputs and outputs, and perform any suitable navigational algorithm. The navigation filter may utilize any suitable inputs (e.g., feed back or input from any other navigation unit or receiver components, IMU, sensor module, etc.) and produce any suitable outputs for the navigator and other components based on the process and measurement models. The navigation filter may employ any conventional or other equations within the systems dynamics matrix, where this matrix may include any suitable dimensions. The systems matrix may be dynamically configured or altered in any desired fashion and based on any information from any other components (e.g., regulator, etc.) to control the navigation filter and/or plant. The navigation filter may employ any suitable conventional or other functions or measurements for the noise and uncertainties matrices (e.g., Q, R, w, etc.), where these matrices may include any suitable dimensions. The navigation filter state variables may be initialized to any suitable values. The outputs of the navigation filter may be provided with respect to any suitable units or reference frames (e.g., NED, body, etc.). The navigation filter may utilize any quantity of any types of sensors.

The navigator may perform any suitable strap-down or other algorithms to determine navigation estimates (e.g., position, velocity, etc.) from the IMU measurements. The navigator may utilize any suitable inputs (e.g., input from any other navigation unit or receiver components, IMU, sensor module, etc.) and produce any suitable outputs. The navigator may apply the error estimates from the navigation filter in any suitable manner (e.g., add/subtract, weighted, average, etc.) to the navigation estimates to determine a navigation solution. The navigation solution may include any desired parameters (e.g., position, velocity, time or clock bias, orientation or attitude, etc.), where the values may be determined with respect to any suitable units or desired reference frames. The navigator may employ any conventional or other equations to determine the navigation solution. The navigator may utilize any quantity of any types of sensors.

The sensors of the sensor module and IMU may be of any quantity or type. For example, the sensors may be standard navigational sensors (COTS) that can be selected with various grade quality without affecting the principles of the present invention embodiments. The sensors may provide any suitable information to the navigation filter, navigator or other navigation unit components. The INS and IMU may be implemented by any conventional or other sensing systems.

The inertial compensation unit may utilize any suitable inputs (e.g., input from any other navigation unit or receiver components, etc.) and produce any suitable outputs for adjustment of the I/Q components from the autocorrelation function. The inertial compensation unit transfer function may include any quantity of poles at any desired locations adhering to the distance relationships described above (e.g., distance from the origin for the poles on the real axis is twice that of the distance from the origin for the poles on the imaginary axis). This distance relationship may be altered in any desired fashion capable of providing stability to the system (e.g., the distance for the real axis may be at least two times greater than the distance for the imaginary axis, etc.). Further, the pole placement technique may be modified in any suitable fashion (e.g., altering distances or locations of the poles, adding or removing poles, etc.) to account for or mitigate other conditions distorting the sensor measurements (e.g., external forces, etc.), and/or to control the bounding of these conditions. The outputs from the inertial compensation unit may be applied to the I/Q components from the autocorrelation function in any suitable manner (e.g., add/subtract, weighted, average, etc.).

The regulator may include any Kalman or other type of filter (e.g., estimator, etc.) to estimate the plant. The state vector of the filter may include any quantity of any suitable state variables representing desired parameters, measurements or characteristics (e.g., representing measurement or parameter errors, actual measurement or parameter values, etc.). The process and measurement models may include any conventional or other equations to relate the state variables to the inputs and outputs, and perform any suitable control algorithm. The regulator may utilize any suitable input (e.g., feedback or input from any other navigation unit or receiver components, etc.) and produce any suitable outputs to control the navigation unit (e.g., adjustments for the I/Q components from the autocorrelation function, etc.). The filter may employ any conventional or other equations within the dynamics matrix, where this matrix may include any suitable dimensions. The regulator may adjust the navigation filter systems matrix in any desired fashion to minimize the cost function and apply control.

The regulator filter may employ any suitable conventional or other functions or measurements for the noise, uncertainties and gain matrices (e.g., Q, R, B, G, w, etc.), where these matrices may include any suitable dimensions. The filter state variables may be initialized to any suitable values. The outputs from the regulator may be combined with the inertial compensation unit outputs in any fashion (e.g., added/subtracted, weighted, averaged, etc.) for application to the I/Q components from the autocorrelation function in any suitable manner (e.g., add/subtract, weighted, average, etc.). The inertial compensation unit and regulator may be utilized in the system individually (e.g., one without the other) or in combination.

The cost function may include any suitable conventional or other function estimating the costs of the plant. The regulator may employ any conventional or other techniques to minimize this function and produce adjustments for the I/Q components from the autocorrelation function. The cost function may be based on any desired parameters, measurements or characteristics (e.g., deviations of results (e.g., position, velocity, etc.) from their desired values, etc.), and may be derived from any conventional or other relationships between these characteristics and desired objectives (e.g., precision, stability, etc.). The resulting gain matrices (e.g., Q, R, etc.) may be of any suitable dimensions, and may be combined with the inertial compensation unit outputs in any fashion (e.g., added/subtracted, weighted, averaged, etc.) for application to the I/Q components from the autocorrelation function in any suitable manner (e.g., add/subtract, weighted, average, etc.). The cost function may be selected to implement any desired stochastic or other control processes over the navigation unit.

The various feedback loops (e.g., FB Loop 1-FB Loop 5) may provide any desired information between any quantity of the navigation unit and receiver components to control the system to follow a desired tracking and/or control scheme. Further, the pre-filter may sample values and/or operate at any desired rates (e.g., on the order of 50-1 k Hz, etc.), while the navigation filter may similarly receive sampled values and/or operate at any desired rates (e.g., on the order of 1 Hz, etc.).

The present invention embodiments provide a ubiquitous navigational solution that provides navigational information in virtually all circumstances where a satellite or other location signal is corrupted or unavailable due to interference (e.g., both intentional and unintentional) and line of sight (LOS) constraints, especially in sub terrain and urban environments, inside buildings, and interference environments. The navigation solution may include any suitable information (e.g., one or more of position, velocity, orientation or attitude, time adjustments or parameters, etc.).

The present invention embodiments may be employed in virtually all applications where navigational information is desired when a satellite or other location signal is corrupted or unavailable. These applications include: protecting forces (Soldier Protection) in counterinsurgency operations; network centric operations at all tiers; mobile Ad-Hoc network communication; directional antennas in Ad-Hoc networks; aviation guidance and control systems; tactical communications; urban military operations; and Intelligence Surveillance and Reconnaissance (ISR). In addition, the inertial compensation unit may be employed in any suitable systems (e.g., tracking, navigation, etc.) employing sensors to compensate for external factors and mitigate sensor error growth rate.

From the foregoing description, it will be appreciated that the invention makes available a novel navigation system and method of obtaining accurate navigational information in signal challenging environments, wherein a navigation system compensates for errors of inertial instruments and provides stochastic control in order to obtain accurate navigational information in a signal challenging environment and provide rapid re-acquisition of a satellite signal after signal loss.

Having described preferred embodiments of a new and improved navigation system and method of obtaining accurate navigational information in signal challenging environments, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A navigation system comprising:
a receiver to receive location signals, correlate said received signals with generated signals to track said location signals and produce signal components based on said correlation;
a plurality of sensors to provide sensor measurements pertaining to said navigation system; and
a navigation unit to control said receiver to track said location signals and to produce a navigation solution based on said sensor measurements and said signal components, wherein said navigation unit includes a processor including:
an extended filter module to determine estimates of navigation information based on at least said signal components and measurements of said sensors;
a navigation module to determine navigation results based on said sensor measurements and to apply said estimates to said determined navigation results to produce said navigation solution;
an inertial compensation module to receive navigation solution information and produce compensation adjustments for said signal components to compensate for errors within said sensor measurements due to gravity, wherein said inertial compensation module includes a transfer function including a plurality of poles residing on real and imaginary axes of a complex plane to bound an inertial error growth rate of said sensors, and wherein magnitudes of distances from an origin of said complex plane for said poles of said transfer function are based on ratios of gravity to a planet dimension; and
a regulator module to receive navigation solution information and produce control adjustments for said signal components to control reliance by said navigation unit on said estimates and said determined navigation results for determining said navigation solution;
wherein said compensation and control adjustments are applied to said signal components provided to said navigation unit to control an amount of contribution of said estimates and said determined navigation results to said navigation solution, and navigation solution information is provided to said receiver to control generation of said generated signals for tracking of said location signals.

2. The system of claim 1, wherein said location signals include satellite signals.

3. The system of claim 2, wherein said receiver includes a GPS receiver.

4. The system of claim 1, wherein said extended filter module includes:
a pre-filter module to determine estimates of errors pertaining to pseudorange information based on said signal components and said navigation information estimates.

5. The system of claim 4, wherein said extended filter module further includes:
a navigation filter module to produce said navigation information estimates based on said estimated errors of said pseudorange information, sensor measurements and navigation solution information, wherein said navigation information estimates include errors pertaining to said navigation results.

6. The system of claim 5, wherein said navigation filter module implements a Kalman filter with a dynamically adjustable system dynamics matrix.

7. The system of claim 1, further including an inertial measurement unit including one or more of said plurality of sensors, wherein said sensors within said inertial measurement unit include inertial sensors and said navigation module determines said navigation results based on measurements by said inertial sensors.

8. The system of claim 1, wherein said poles of said transfer function reside on real and imaginary axes of a complex S-plane, and wherein a distance from the origin for poles on the real axis is greater than the distance from the origin for poles on the imaginary axis.

9. The system of claim 8, wherein said transfer function includes two poles on each of the real and imaginary axes, and wherein said distance from the origin for said poles on said real axis is twice that of said distance from the origin for said poles on said imaginary axis.

10. The system of claim 1, wherein said regulator module includes:
an observer module to estimate states of said navigation unit; and
a control module to determine weight values to minimize a cost function associated with desired objectives and based on said estimated states, wherein said control adjustments are produced based on said determined weight values to control said navigation unit.

11. The system of claim 10, wherein said cost function is based on deviations of said estimated states with desired values, and said desired objectives include stability and precision.

12. The system of claim 10, wherein said extended filter module implements a Kalman filter and said regulator module dynamically adjusts a system dynamics matrix of said Kalman filter to reduce said cost function.

13. The system of claim 1, wherein said navigation solution includes one or more of position, velocity, orientation and time parameters.

14. The system of claim 1, wherein said regulator module controls said navigation unit to place greater reliance on said navigation results for determining said navigation solution in response to said location signals traversing a signal challenging environment or being unavailable.

15. The system of claim 1, wherein said regulator module controls said navigation unit to place greater reliance on said estimates for determining said navigation solution in response to said location signals being available.

16. A method of determining a navigation solution within a navigation system including a receiver, a plurality of sensors to provide sensor measurements pertaining to said navigation system and a processor to control said receiver to track said location signals and to produce said navigation solution, said method comprising:
   (a) receiving location signals, correlating said received signals with generated signals to track said location signals and producing signal components based on said correlation;
   (b) determining estimates of navigation information based on at least said signal components and measurements of said sensors;
   (c) determining navigation results based on said sensor measurements and applying said estimates to said determined navigation results to produce said navigation solution;
   (d) producing compensation adjustments for said signal components for inertial compensation to compensate for errors within said sensor measurements due to gravity, wherein said inertial compensation applies a transfer function including a plurality of poles residing on real and imaginary axes of a complex plane to bound an inertial error growth rate of said sensors, and wherein magnitudes of distances from an origin of said complex plane for said poles of said transfer function are based on ratios of gravity to a planet dimension;
   (e) producing control adjustments for said signal components based on navigation solution information to control reliance on said estimates and said determined navigation results for determining said navigation solution; and
   (f) applying said compensation and control adjustments to said signal components to control an amount of contribution of said estimates and said determined navigation results to said navigation solution and providing navigation solution information to said receiver to control generation of said generated signals for tracking of said location signals.

17. The method of claim 16, wherein said receiver includes a GPS receiver.

18. The method of claim 16, wherein step (b) further includes:
   (b.1) determining estimates of errors pertaining to pseudo-range information based on said signal components and said navigation information estimates.

19. The method of claim 18, wherein step (b) further includes:
   (b.2) producing said navigation information estimates based on said estimated errors of said pseudorange information, sensor measurements and navigation solution information, wherein said navigation information estimates include errors pertaining to said navigation results.

20. The method of claim 19, wherein step (b.2) further includes:
   (b.2.1) producing said navigation information estimates via a Kalman filter with a dynamically adjustable system dynamics matrix.

21. The method of claim 16, wherein step (d) further includes:
   (d.1) compensating for errors within said sensor measurements by employing said transfer function including said poles residing on real and imaginary axes of a complex S-plane, wherein a distance from the origin for poles on the real axis is greater than the distance from the origin for poles on the imaginary axis.

22. The method of claim 21, wherein said transfer function includes two poles on each of the real and imaginary axes, and wherein said distance from the origin for said poles on said real axis is twice that of said distance from the origin for said poles on said imaginary axis.

23. The method of claim 16, wherein step (e) further includes:
   (e.1) estimating states of said navigation system; and
   (e.2) determining weight values to minimize a cost function associated with desired objectives and based on said estimated states, wherein said control adjustments are produced based on said determined weight values.

24. The method of claim 23, wherein said cost function is based on deviations of said estimated states with desired values, and said desired objectives include stability and precision.

25. The method of claim 23, wherein step (b) further includes:
   (b.1) producing said navigation information estimates via a Kalman filter with a dynamically adjustable system dynamics matrix; and
   step (e) further includes:
   (e.3) dynamically adjusting said system dynamics matrix of said Kalman filter to reduce said cost function.

26. The method of claim 16, wherein said navigation solution includes one or more of position, velocity, orientation and time parameters.

27. The method of claim 16, wherein step (e) further includes:
   (e.1) controlling said navigation system to place greater reliance on said navigation results for determining said navigation solution in response to said location signals traversing a sip challenging environment or being unavailable.

28. The method of claim 16, wherein step (e) further includes:
   (e.1) controlling said navigation system to place greater reliance on said estimates for determining said navigation solution in response to said location signals being available.

* * * * *